US009179067B2

(12) United States Patent
Takizawa

(10) Patent No.: US 9,179,067 B2
(45) Date of Patent: Nov. 3, 2015

(54) CAMERA DRIVE DEVICE WITH A MOVEABLE UNIT THAT IS FREELY ROTATABLE RELATIVE TO A FIXED UNIT

(71) Applicant: Panasonic Intellectual Property Corporation of America, Torrance, CA (US)

(72) Inventor: Teruyuki Takizawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 8 days.

(21) Appl. No.: 14/130,771

(22) PCT Filed: Apr. 26, 2013

(86) PCT No.: PCT/JP2013/002835
§ 371 (c)(1),
(2) Date: Jan. 3, 2014

(87) PCT Pub. No.: WO2013/168391
PCT Pub. Date: Nov. 14, 2013

(65) Prior Publication Data
US 2014/0125824 A1 May 8, 2014

(30) Foreign Application Priority Data
May 10, 2012 (JP) .................................. 2012-108643

(51) Int. Cl.
*H04N 5/228* (2006.01)
*H04N 5/232* (2006.01)
(Continued)

(52) U.S. Cl.
CPC ............ *H04N 5/23261* (2013.01); *G02B 7/023* (2013.01); *G03B 5/00* (2013.01); *G03B 17/02* (2013.01); *G03B 17/561* (2013.01); *G03B 2205/0007* (2013.01)

(58) Field of Classification Search
CPC ................................................ H04N 5/23261
USPC ...................................................... 348/208.3
See application file for complete search history.

(56) References Cited

U.S. PATENT DOCUMENTS

| 5,956,529 A | 9/1999 | Lee et al. |
| 2006/0033818 A1* | 2/2006 | Wada et al. .............. 348/208.11 |

(Continued)

FOREIGN PATENT DOCUMENTS

| JP | 11-220651 A | 8/1999 |
| JP | 2006-053358 A | 2/2006 |

(Continued)

OTHER PUBLICATIONS

International Search Report for corresponding International Application No. PCT/JP2013/002835 mailed Aug. 13, 2013.
(Continued)

*Primary Examiner* — Usman Khan
(74) *Attorney, Agent, or Firm* — Renner, Otto, Boisselle & Sklar, LLP

(57) ABSTRACT

A camera driving apparatus includes a camera section including an imaging plane; a movable unit having the camera section built therein, having an attracting magnet therein, and having a convex partial spherical surface along an outer surface thereof; a fixed unit having a magnetic member therein and having a recess loosely fitted with the movable unit, wherein a magnetic attracting force of the attracting magnet with respect to the magnetic member puts the convex partial spherical surface of the movable unit into point or line contact with the recess and thus the movable unit is freely rotatable around a sphere center of the first convex partial spherical surface; a panning driving section; a tilting driving section; a rolling driving section; a first detector for detecting a tilt angle of the camera section in the panning and tilting directions with respect to the fixed unit; and a second detector for detecting a rotation angle of the camera section in the rolling direction. The second detector is provided in the vicinity of the sphere center of the first convex partial spherical surface.

33 Claims, 26 Drawing Sheets

(51) Int. Cl.
    *G03B 5/00*     (2006.01)
    *G02B 7/02*     (2006.01)
    *G03B 17/02*     (2006.01)
    *G03B 17/56*     (2006.01)

(56) References Cited

U.S. PATENT DOCUMENTS

| | | | |
|---|---|---|---|
| 2008/0240704 A1* | 10/2008 | Takahashi | 396/419 |
| 2010/0202766 A1* | 8/2010 | Takizawa et al. | 396/55 |
| 2011/0122495 A1* | 5/2011 | Togashi | 359/557 |
| 2012/0182472 A1 | 7/2012 | Inata et al. | |

FOREIGN PATENT DOCUMENTS

| | | |
|---|---|---|
| JP | 2008-058391 A | 3/2008 |
| JP | 2010-085447 A | 4/2010 |
| JP | 2010-112978 A | 5/2010 |
| WO | WO 2010/010712 A1 | 1/2010 |
| WO | WO 2012/004994 A1 | 1/2012 |

OTHER PUBLICATIONS

Form PCT/ISA/237 for corresponding International Application No. PCT/JP2013/002835 dated Aug. 13, 2013 and partial English translation.

* cited by examiner

FIG.3A
FIG.3B
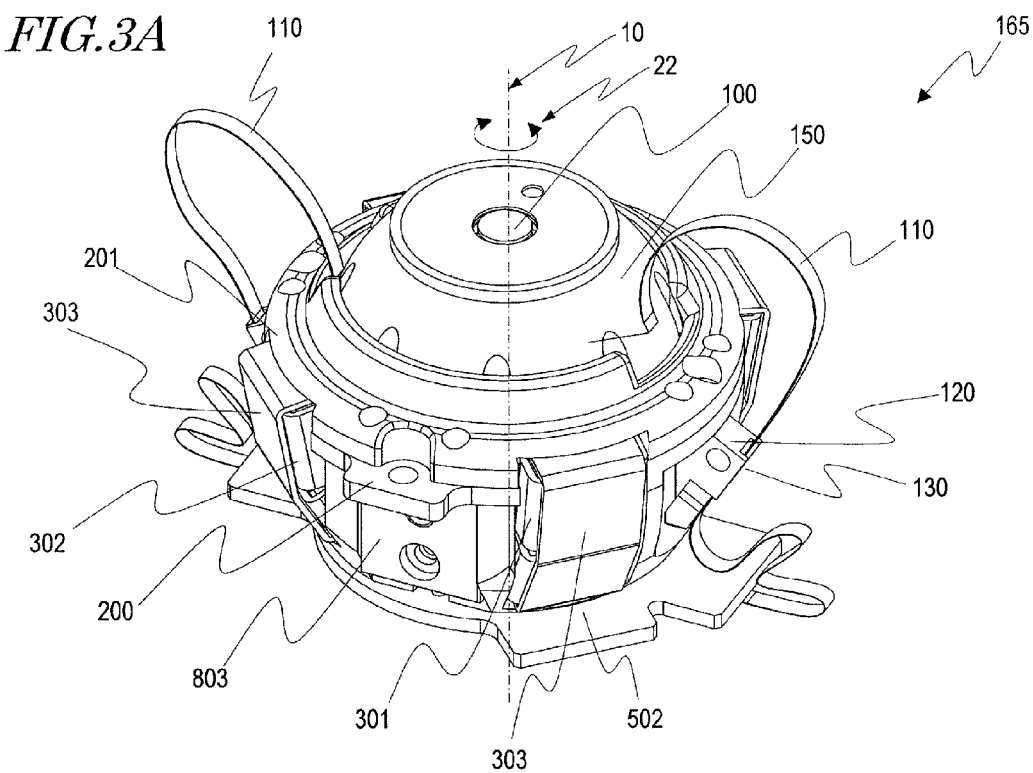
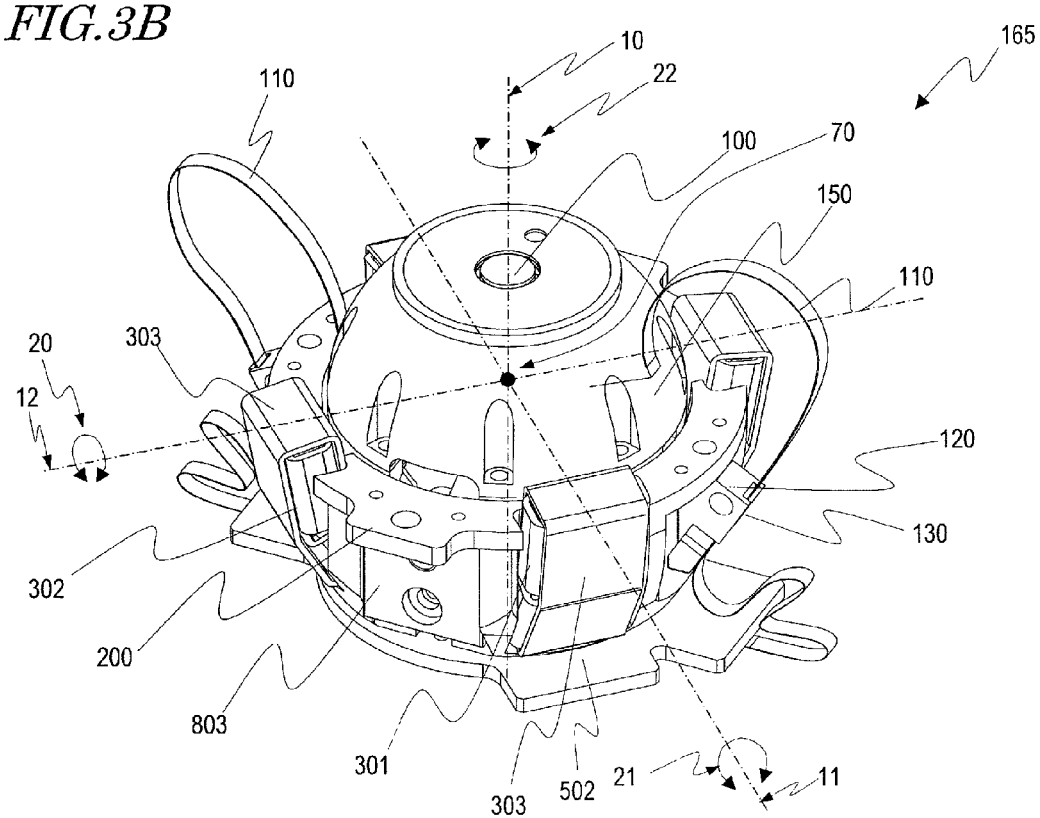

FIG. 9A
FIG. 9B
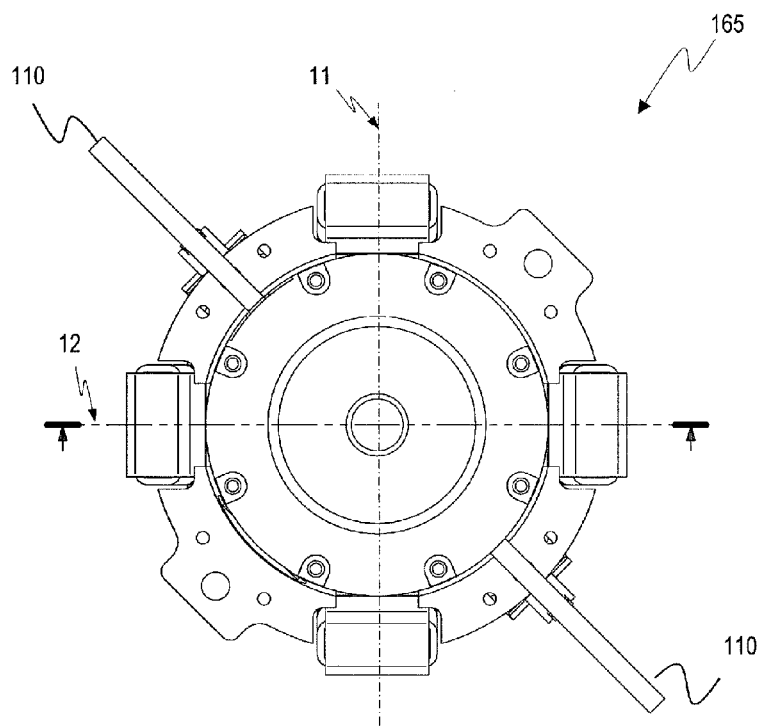
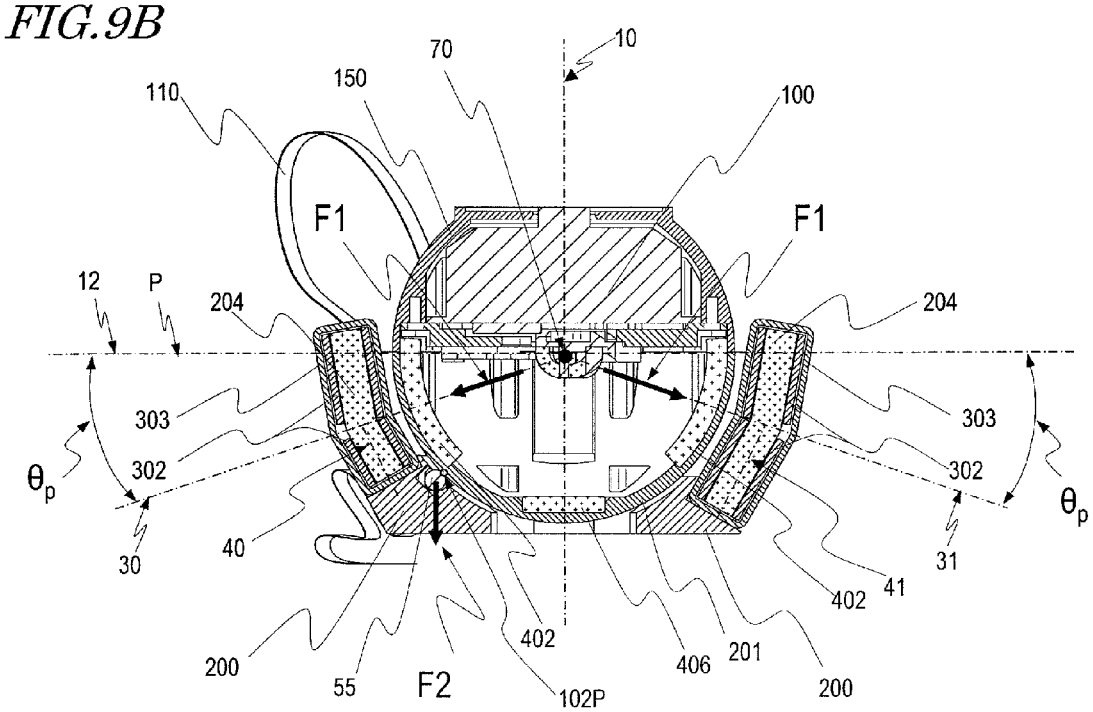

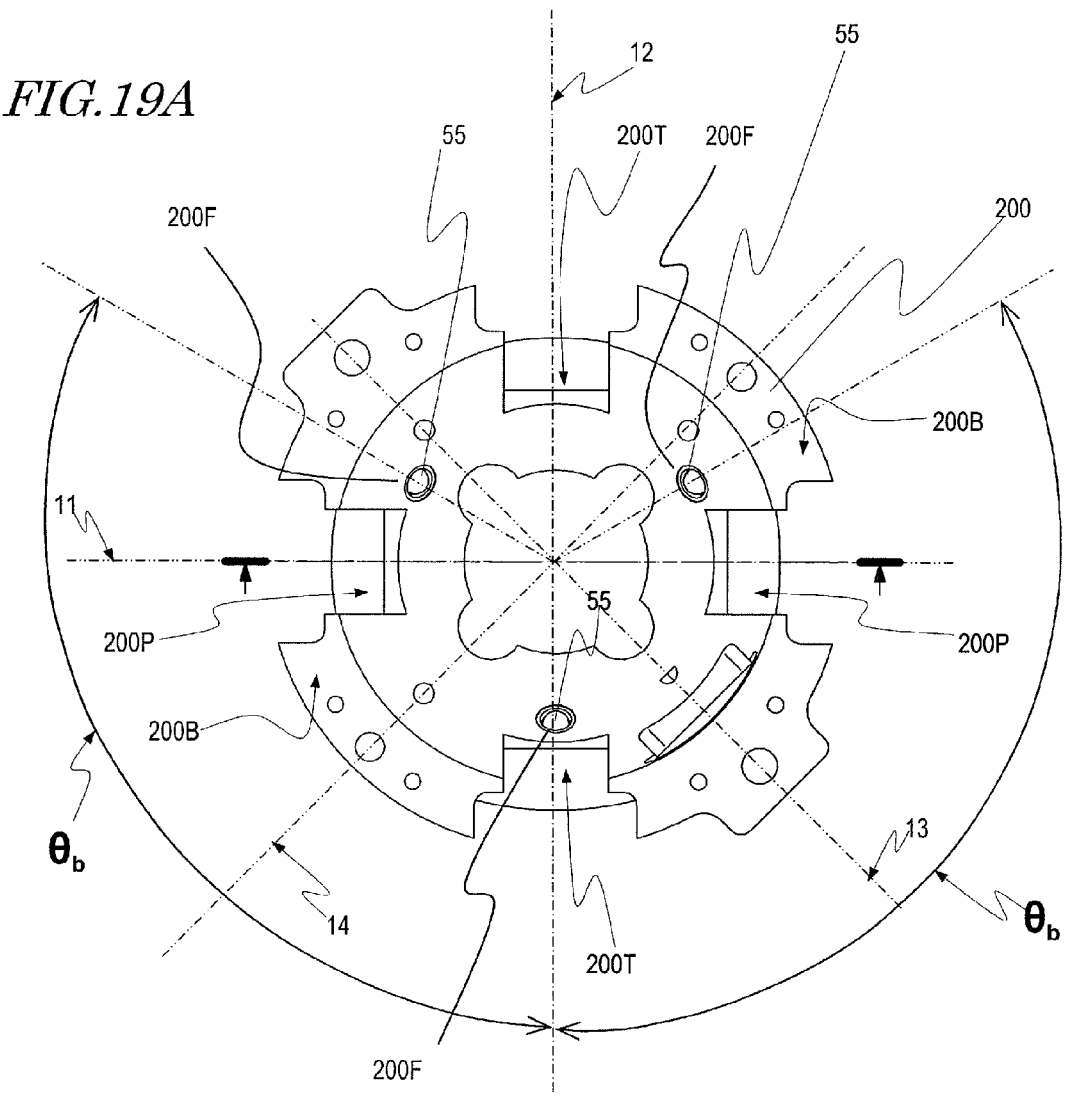

CAMERA DRIVE DEVICE WITH A MOVEABLE UNIT THAT IS FREELY ROTATABLE RELATIVE TO A FIXED UNIT

TECHNICAL FIELD

The present application relates to a camera driving apparatus capable of inclining a camera section, including an imaging element, in a panning (yawing) direction and a tilting (pitching) direction and also capable of rotating (rolling) the camera section around an optical axis of the lens.

BACKGROUND ART

Many of video cameras and digital cameras recently on the market include a camera-shake compensation device for compensating for blurring of a captured image caused by camera-shake. The camera-shake compensation device inclines a lens, a lens barrel, a reflective mirror, an imaging element or the like with respect to an optical axis of the camera, or moves such a component on a plane perpendicular to the optical axis two-dimensionally.

For example, Patent Document 1 discloses a shake compensation mechanism having a structure in which the lens barrel is elastically supported at one point and inclined with respect to the optical axis. Patent Document 2 discloses a camera-shake compensation device in which the mirror is supported by a pivot structure and inclined with respect to the optical axis. Patent Document 3 discloses an imaging lens unit in which a spherical lens barrel is supported at three points and inclined while being moved along the optical axis.

CITATION LIST

Patent Literature

Patent Document 1: Japanese Laid-Open Patent Publication No. 2006-53358
Patent Document 2: Japanese Laid-Open Patent Publication No. 11-220651
Patent Document 3: Japanese Laid-Open Patent Publication No. 2008-58391

SUMMARY OF INVENTION

Technical Problem

The conventional camera-shake compensation devices can merely compensate for a camera-shake of a small angle. A non-limiting illustrative embodiment of the present application provides a camera driving apparatus capable of rotating a camera section at a larger angle in three axial directions.

Solution to Problem

A camera driving apparatus according to an embodiment of the present invention includes a camera section including an imaging element having an imaging plane, a lens having an optical axis and provided for forming an image of a subject on the imaging plane, and a lens barrel for holding the lens; a movable unit having at least one attracting magnet and having the camera section built therein, the movable unit having a first convex partial spherical surface along an outer surface thereof; a fixed unit having at least one magnetic member and having a recess loosely fitted with at least a part of the movable unit, wherein a magnetic attracting force between the at least one attracting magnet and the at least one magnetic member puts the first convex partial spherical surface of the movable unit and the recess into point or line contact with each other, and thus the movable unit is freely rotatable around a sphere center of the first convex partial spherical surface as the center of rotation; a panning driving section for inclining the camera section in a panning direction with respect to the fixed unit; a tilting driving section for inclining the camera section in a tilting direction, perpendicular to the panning direction, with respect to the fixed unit; a rolling driving section for rotating the camera section in a rolling direction centered around the optical axis of the lens, with respect to the fixed unit; a first detector for detecting a tilt angle of the camera section in the panning and tilting directions with respect to the fixed unit; and a second detector for detecting a rotation angle of the camera section in the rolling direction. The second detector is provided in the vicinity of the sphere center of the first convex partial spherical surface.

Advantageous Effects of Invention

The camera driving apparatus in an embodiment according to the present invention includes a movable unit having an attracting magnet and a first convex partial spherical surface; and a fixed unit having a magnetic member and a recess loosely fitted with at least a part of the movable unit and is put into point or line contact with the movable unit by a magnetic attracting force of the attracting magnet with respect to the magnetic member. Therefore, the movable unit can be freely rotatable around the sphere center of the first convex partial spherical surface with respect to the fixed unit. In addition, the first convex partial spherical surface is kept in a state of being inscribed in the recess by the magnetic attracting force. Therefore, the load caused by the contact can be made constant regardless of the rotation state of the movable unit.

BRIEF DESCRIPTION OF DRAWINGS

FIG. 3A is an isometric view of Embodiment 1 according to the present invention as seen from above.

FIG. 3B is an isometric view of Embodiment 1 according to the present invention as seen from above in the state where a fall preventive member 201 has been removed.

FIG. 9A is a plan view of Embodiment 1 according to the present invention.

FIG. 9B is a cross-sectional view of the camera driving apparatus 165 in Embodiment 1 according to the present invention taken along a plane including the optical axis 10 and a panning direction rotation axis 12.

FIG. 19A is a plan view of the fixed unit in Embodiment 1 according to the present invention.

DESCRIPTION OF EMBODIMENTS

Figure 1:
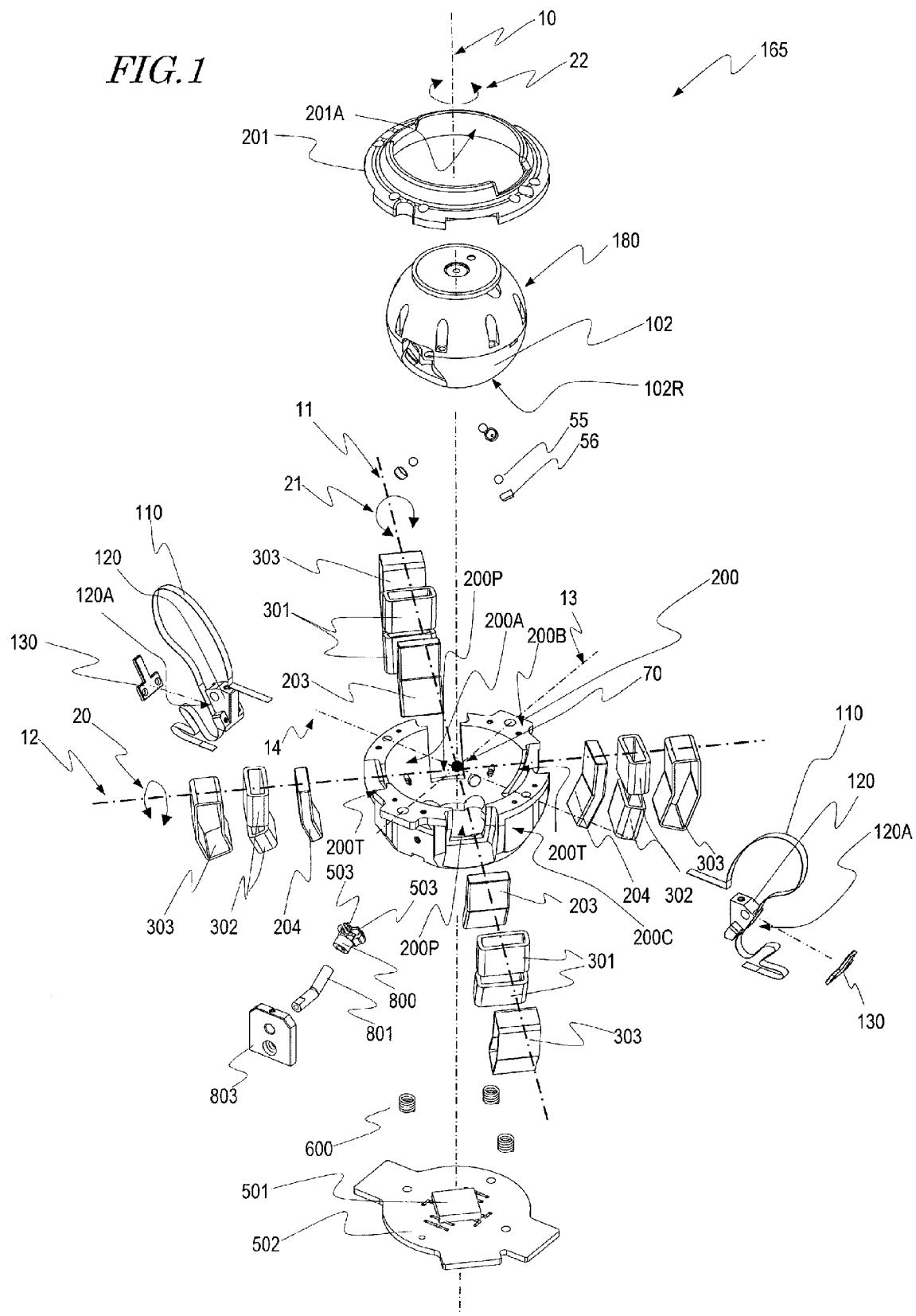
FIG. 1 is an exploded isometric view schematically showing a structure of a camera driving apparatus 165 in Embodiment 1 according to the present invention.

The inventor of the present application made detailed studies on camera-shake compensation devices included in conventional cameras or video cameras. It is generally considered that the camera-shake angle caused when a person takes an image while being still is about ±0.3 degrees and that the generated frequency component is about 20 to 30 Hz. It is also considered that the camera-shake compensation needs to be controlled in a frequency band of about 10 Hz.

As is understood, when a photographer takes an image using a video camera or a digital camera while being still, the camera-shake angle is relatively small and the frequency for the control is relatively low. Owing to this, a conventional camera driving apparatus for compensating for blurring of a captured image caused by the camera-shake which occurs while the photographer is in a still state realizes good camera-shake compensation, despite that the tilt angle at which each of sections of the camera driving apparatus (lens, lens barrel, reflective mirror, imaging element, etc.) is to be inclined with respect to the optical axis of the lens, or the amount by which such a component is to be moved straight two-dimensionally on a plane perpendicular to the optical axis, is very small.

However, when the photographer takes a moving image or a still image while walking, the angle of a shake of an image (hereinafter, occasionally referred to as "walk-shake"; walk-shake encompasses camera-shake) is, for example, ±10 degrees or greater. It is considered that the walk-shake compensation needs to be controlled in a frequency band of about 50 Hz.

When the angle of the shake of the image is larger and the compensation needs to be controlled at a higher frequency, the conventional camera driving apparatuses have problems in the structure of a support system for supporting the components and a driving system for driving the components.

For example, the device in Patent Document 1 is suitable for inclining the lens barrel at a very small angle. However, for inclining the lens barrel at a large angle exceeding ±10 degrees, an elastic body which supports the lens barrel is considered to be deformed to the level of plasticity. In addition, when the angle at which the lens barrel is inclined becomes large, the load caused by the spring constant of the elastic body becomes excessively large, and the amplitude increase coefficient (Q factor) of inherent vibration by the elastic body is also increased. It is considered that as a result, the phase characteristic and the gain characteristic of the compensation control are declined, and thus it becomes difficult to control the compensation in the above-described frequency band.

The device in Patent Document 2 drives the reflective mirror in order to compensate for the shake of the image. However, where a video camera or a digital camera includes a wide-angle lens system, a reflective mirror provided in the optical system cannot avoid becoming large. Therefore, the reflective mirror cannot be considered to be a solution suitable for a video camera or a digital camera, which is desired to be compact. In addition, the mirror is supported with a pivot structure using a magnetic attracting force, and thus may fall due to an external disturbance such as vibration, impact or the like.

The lens unit in Patent Document 3 includes a spherical lens holder, and thus can incline the lens holder at a large angle. However, the rotating radius of a part along which the lens holder contacts a holder provided outer to the lens holder is large. Therefore, the frictional load on a movable unit is large, and thus the moving distance by motion is long. For this reason, it is considered that when the tilt angle becomes large, the contact frictional load changes much, which makes it difficult to provide accurate control. Unless the gap between the lens holder and the holder provided outer thereto is controlled accurately, it is difficult to accurately control the tilt angle of the lens holder. Depending on the processing precision of these components, a mechanical looseness may occur, which may deteriorate the frequency response characteristic of the movable unit.

None of the devices in Patent Documents 1 through 3 has a structure for rotating a component such as a lens or the like around the optical axis of the camera section. Therefore, it is difficult to control a large rotation angle around the optical axis of the camera section at high precision.

In light of these problems of the conventional art, the inventor of the present application conceived a camera driving apparatus having a novel structure. An overview of an embodiment of the present invention is as follows.

A camera driving apparatus in an embodiment according to the present invention includes a camera section including an imaging element having an imaging plane, a lens having an optical axis and provided for forming an image of a subject on the imaging plane, and a lens barrel for holding the lens; a movable unit having at least one attracting magnet and having the camera section built therein, the movable unit having a first convex partial spherical surface along an outer surface thereof; a fixed unit having at least one magnetic member and having a recess loosely fitted with at least a part of the movable unit, wherein a magnetic attracting force between the at least one attracting magnet and the at least one magnetic member puts the first convex partial spherical surface of the movable unit and the recess into point or line contact with each other, and thus the movable unit is freely rotatable around a sphere center of the first convex partial spherical surface as the center of rotation; a panning driving section for inclining the camera section in a panning direction with respect to the fixed unit; a tilting driving section for inclining the camera section in a tilting direction, perpendicular to the panning direction, with respect to the fixed unit; a rolling driving section for rotating the camera section in a rolling direction centered around the optical axis of the lens, with respect to the fixed unit; a first detector for detecting a tilt angle of the camera section in the panning and tilting directions with respect to the fixed unit; and a second detector for detecting a rotation angle of the camera section in the rolling direction. The second detector is provided in the vicinity of the sphere center of the first convex partial spherical surface.

The second detector is provided in the vicinity of the sphere center of the movable unit; the second detector includes a pair of rotation detection magnets located symmetrically with respect to the optical axis, a rod-shaped holder bar fixed to the fixed unit and having one end thereof inserted to a position in the vicinity of the sphere center, and a pair of second magnetic sensors fixed to the one end of the holder bar so as to face the pair of rotation detection magnets respectively; and the pair of second magnetic sensors detect a change in a magnetic force caused by a rotation of the rotation detection magnets to calculate the rotation angle of the camera section.

The movable unit has an opening into which the holder bar is inserted, and the opening and the holder bar contact each other to restrict the rotation angle of the movable unit.

The unit has at least three second convex partial spherical surfaces located in the recess, and the second convex partial spherical surfaces and the first convex partial spherical surface of the movable unit are in point contact with each other.

The fixed unit has a recessed conical surface which forms an inner surface of the recess, and the conical surface and the first convex partial spherical surface of the movable unit are in line contact with each other.

The camera driving apparatus further includes a fall preventive member provided in the fixed unit and having a restriction surface for restricting a movement of the movable unit to prevent the movable unit from being disengaged from the fixed unit. The restriction surface has a recessed partial spherical surface having a center matching the sphere center of the first convex partial spherical surface.

The panning driving section includes a pair of panning driving magnets located in the movable unit symmetrically with respect to the optical axis, a pair of panning magnetic yokes located in the fixed unit so as to face the pair of panning driving magnets respectively, and a pair of panning driving coils wound around the pair of panning magnetic yokes respectively. The tilting driving section includes a pair of tilting driving magnets located in the movable unit symmetrically with respect to the optical axis, a pair of tilting magnetic yokes located in the fixed unit so as to face the pair of tilting driving magnets respectively, and a pair of tilting driving coils wound around the pair of tilting magnetic yokes respectively. The pair of panning driving magnets and the pair of panning driving coils are located on a straight line passing the sphere center of the first convex partial spherical surface; the pair of tilting driving magnets and the pair of tilting driving coils are located on another straight line passing the sphere center of the first convex partial spherical surface and crossing the straight line perpendicularly; and a middle point between the pair of panning driving magnets on the optical axis, a middle point between the pair of panning driving coils on the optical axis, a middle point between the pair of tilting driving magnets on the optical axis, and a middle point between the pair of tilting driving coils on the optical axis substantially match the sphere center of the convex partial spherical surface.

The rolling driving section includes four rolling driving coils wound around the pair of panning magnetic yokes and the pair of tilting magnetic yokes; and the pair of panning driving magnets and the pair of tilting driving magnets are used as rolling driving magnets.

The at least one magnetic member includes the pair of panning magnetic yokes and the pair of tilting magnetic yokes.

The attracting magnet includes the pair of panning driving magnets and the pair of tilting driving magnets.

Straight lines which are respectively perpendicular to winding center axes of the pair of panning driving coils and the pair of tilting driving coils, pass the sphere center of the first convex partial spherical surface and respectively pass the driving coils have a tilt angle A of 45 degrees or less with respect to a horizontal plane which is perpendicular to the optical axis and passes the sphere center of the first convex partial spherical surface; and the pair of panning driving magnets and the pair of tilting driving magnets are located as inclining with respect to the movable unit so as to face the pair of panning driving coils and the pair of tilting driving coils respectively.

Straight lines which are respectively perpendicular to winding center axes of the pair of rolling driving coils and pass the sphere center of the first convex partial spherical surface have a tilt angle B of 45 degrees or less with respect to a horizontal plane which is perpendicular to the optical axis and passes the sphere center of the first convex partial spherical surface and centers of the rolling driving coils; and the pair of rolling driving magnets are located as inclining with respect to the movable unit so as to face the rolling driving coils respectively.

The tilt angle A is 20 degrees, and the tilt angle B is 20 degrees.

A straight line connecting a sphere center of each of the second convex partial spherical surfaces and the sphere center of the first convex partial spherical surface has a tilt angle C of 45 degrees with respect to a horizontal plane which is perpendicular to the optical axis and passes the sphere center of the first convex partial spherical surface.

The pair of panning driving magnets, the pair of tilting driving magnets, and the pair of rolling driving magnets are located inside the movable unit and are not exposed to the first convex partial spherical surface.

The pair of panning driving coils, the pair of tilting driving coils, and the pair of rolling driving coils are located inside the fixed unit and are not exposed from the recess.

The movable unit is formed of a resin material.

The movable unit is integrally molded with the pair of panning driving magnets, the pair of tilting driving magnets and the pair of rolling driving magnets.

The fixed unit is formed of a resin material.

The fixed unit is integrally molded with the pair of panning driving coils, the pair of tilting driving coils, the pair of rolling driving coils, the pair of panning magnetic yokes, the pair of tilting magnetic yokes, and the pair of rolling magnetic yokes.

The movable unit has a center of gravity matching the sphere center of the first convex partial spherical surface.

The camera driving apparatus further includes lines connected to the camera section and formed of flexible cables. The lines are located in line symmetry with respect to the optical axis, and are each fixed to the movable unit in a direction having an angle of 45 degrees with respect to a line connecting the pair of tilting driving magnets to each other or a line connecting the pair of panning driving magnets to each other on a plane perpendicular to the optical axis.

The first detector includes a first magnetic sensor fixed to the fixed unit; and an inclination detection magnet provided in the movable unit. The first magnetic sensor detects a change in a magnetic force caused by inclination of the inclination detection magnet to calculate a two-dimensional tilt angle of the camera section in the panning direction and the tilting direction.

The first magnetic sensor and the inclination detection magnet are located on the optical axis.

The first detector includes a light sensor fixed to the fixed unit; and a light detection pattern provided on a part of the first convex partial spherical surface of the movable unit. The light sensor detects a change in an amount of light incident thereon caused by inclination of the light detection pattern to calculate a two-dimensional tilt angle of the camera section in the panning direction and the tilting direction.

The light sensor and the light detection pattern are located on the optical axis.

The second detector includes a pair of second magnetic sensors fixed to the fixed unit; and a pair of rotation detection magnets provided in the movable unit. The pair of second magnetic sensors detects a change in a magnetic force caused by a rotation of the rotation detection magnets to calculate a rotation angle of the camera section.

When the movable unit is located at a neutral position, the pair of second magnetic sensors, the pair of rotation detection magnets and the holder are located on a plane perpendicular to the optical axis, on a straight line having a degree of 45 degrees with respect to a straight line connecting the pair of panning driving magnets and with respect to a straight line connecting the pair of tilting driving magnets.

The pair of rotation detection magnets are formed of magnets which are located, on a plane perpendicular to the optical axis, parallel to a straight passing the sphere center of the first convex partial spherical surface and are magnetized oppositely to each other.

The restriction surface of the fall preventive member and the first convex partial spherical surface of the movable unit have a gap therebetween; and the gap is determined such that the first convex partial spherical surface of the movable unit, even when being separated from the recess of the fixed unit, is returned to a point contact state or a line contact state by the magnetic attracting force.

A camera unit in an embodiment according to the present invention includes the camera driving apparatus defined by any one of the above; angular velocity sensor for detecting angular velocities around three axes of the fixed unit which are perpendicular to one another; a calculation processing section for generating a target rotation angle signal based on outputs from the angular velocity sensors; and a driving circuit for generating a signal for driving the first driving section and the second driving section based on the target rotation angle signal.

An optical device driving apparatus in an embodiment according to the present invention includes an optical device, having an optical axis, for receiving or emitting light; a movable unit having at least one attracting magnet therein and having the optical device built therein, the movable unit having a first convex partial spherical surface along an outer surface thereof; a fixed unit having at least one magnetic member therein and having a recess loosely fitted with at least a part of the movable unit, wherein a magnetic attracting force between the at least one attracting magnet and the at least one magnetic member puts the first convex partial spherical surface of the movable unit and the recess into point or line contact with each other, and thus the movable unit is freely pivotable around a sphere center of the first convex partial spherical surface as the center of rotation; a panning driving section for inclining the optical device in a panning direction with respect to the fixed unit; a tilting driving section for inclining the optical device in a tilting direction, perpendicular to the panning direction, with respect to the fixed unit; a rolling driving section for rotating the optical device in a rolling direction centered around the optical axis of the lens, with respect to the fixed unit; a first detector for detecting a tilt angle of the optical device in the panning and tilting directions with respect to the fixed unit; and a second detector for detecting a rotation angle of the camera section in the rolling direction. The second detector is provided in the vicinity of the sphere center of the first convex partial spherical surface.

The camera driving apparatus in an embodiment according to the present invention includes a movable unit having an attracting magnet and a first convex partial spherical surface; and a fixed unit having a magnetic member and a recess loosely fitted with at least a part of the movable unit and is put into point or line contact with the movable unit by a magnetic attracting force of the attracting magnet with respect to the magnetic member. Therefore, the movable unit can be freely rotatable around the sphere center of the first convex partial spherical surface with respect to the fixed unit. In addition, the first convex partial spherical surface is kept in a state of being inscribed in the recess by the magnetic attracting force. Therefore, the load caused by the contact can be made constant regardless of the rotation state of the movable unit.

The pivot support structure of engaging the convex partial spherical surface with the recess supports the movable unit at the center of gravity. Therefore, the mechanical resonance can be significantly suppressed in the control frequency range.

In addition, the following effects are provided. Specifically, the fall preventive member may be provided. In this case, even when an external impact is applied to the movable unit, the movable unit is not disengaged and can be recovered to the state where the convex partial spherical surface is in contact with the recess.

In the pivot structure, the convex partial spherical surface of the movable unit is inscribed in the recessed conical surface of the fixed unit. In the pivot structure, a certain normal force caused by a magnetic attracting force which is not influenced by the pivoting angle may be applied. In this case, the fluctuation in the frictional load caused in accordance with the pivoting angle is suppressed, and good phase and gain characteristics can be realized in the control frequency range.

The fall preventive member fixed to the fixed unit may have a disengagement preventive restriction surface. In this case, the work of assembling the moving unit with the fixed unit is made easy. This can significantly improve the ease of assembly.

The panning and tilting driving sections include two pairs of driving magnets fixed to the movable unit and located on a circumference centered around the optical axis and on lines perpendicular to each other, and two pairs of driving coils provided in the fixed unit so as to face the driving magnets respectively.

The rolling driving section includes a pair of driving magnets fixed to the movable unit and located on a circumference centered around the optical axis, and a pair of driving coils provided in the fixed unit so as to face the driving magnets respectively.

A moving magnet driving structure of mounting the driving magnets on the movable unit may be adopted. In this case, the supply of a driving current to the movable unit can be made unnecessary.

The generally ring-shaped gap formed between the convex partial spherical surface of the movable unit and the disengagement preventive restriction surface of the fixed unit may be filled with a viscous member or a magnetic fluid for attenuating vibration. In this case, the amplitude increase coefficient (Q factor) caused by a magnetic spring effect provided by a magnetic attracting force, which is generated between the driving magnets provided in the movable unit and the magnetic yokes provided in the fixed unit, and the Q factor of the mechanical normal mode, can be decreased. Thus, a good control characteristic can be provided.

Means for detecting the inclination of the movable unit includes an inclination detection magnet provided on the optical axis on a bottom of the movable unit and a first magnetic sensor provided in the fixed unit so as to face the inclination detection magnet. Owing to this, a change in the magnetic force of the inclination detection magnet that is caused by an inclination of the movable unit is detected, and the tilt angle is calculated. Thus, the size of the camera driving apparatus can be decreased.

Means for detecting the rotation of the movable unit includes a pair of rotation detection magnets provided in the vicinity of the sphere center of the first convex partial spherical surface of the movable unit and located symmetrically with respect to the optical axis of the camera section, a rod-shaped holder fixed to the fixed unit and inserted to a position in the vicinity of the sphere center, and a pair of second magnetic sensors fixed to the fixed section so as to face the pair of rotation detection magnets respectively. Owing to this, a change in the magnetic force of the rotation detection magnets can be detected. Especially because the pair of rotation detection magnets are provided in the vicinity of the sphere center of the movable unit, the moving offset amount of the rotation detection magnets caused by the inclination of the movable unit can be decreased.

Therefore, the crosstalk output, which is usually generated when the movable unit is pivoted in the panning and tilting directions, can be significantly decreased. Thus, only the angle in the rolling direction can be extracted and detected in the range in which the movable unit is movable.

The rotation detection means may be located at an angle of 45 degrees with respect to the panning driving section and the tilting driving section as seen from the direction of the optical axis, and a plurality of driving sections may be provided on a circumference centered around the optical axis. In this case, the driving moment is improved. In the case where the rotation detection means is provided on the same circumference, the camera driving apparatus realizes space savings.

Regarding the rolling driving section, the panning and tilting driving magnets may be used as the rolling driving magnets. The rolling driving coils may be wound around the panning and tilting magnetic yokes in a cross-winding manner, namely, in a direction perpendicular to a direction in which the panning and tilting driving coils are wound. In this case, the camera driving apparatus realizes space savings and also decreases the size and the number of components thereof.

The panning, tilting and rolling driving coils fixed to the fixed unit and the panning, tilting and rolling driving magnets mounted on the movable unit so as to face the driving coils respectively may be located on straight lines perpendicular to the optical axis and also located as inclining downward at an angle of 30 to 45 degrees with respect to the horizontal plane including the sphere center of the convex partial spherical surface of the movable unit. In this case, the height of the camera driving apparatus can be suppressed low.

The magnetic attracting force to be generated between the movable unit and the fixed unit can be obtained in a dispersed manner between the plurality of driving magnets and the plurality of magnetic yokes in the panning, tilting and rolling driving sections. Therefore, the frictional resistance caused by the normal force between the movable unit and the fixed unit can have a constant value regardless of the pivoting angle.

The panning, tilting and rolling driving magnets are built in the movable unit and are not exposed to the convex partial spherical surface of the movable unit that is in contact with the recessed conical surface of the fixed unit. Therefore, the coefficient of friction between the movable unit and the fixed unit can be decreased.

The recessed conical surface of the fixed unit and the convex partial spherical surface of the movable unit may be formed of a highly slidable plastic resin. In this case, the coefficient of friction between the movable unit and the fixed unit can be further decreased.

At least three support balls may be provided between the recessed conical surface of the fixed unit and the convex partial spherical surface of the movable unit. In this case, the coefficient of friction between the movable unit and the fixed unit can be further decreased.

The panning, tilting and rolling driving sections may be located on straight lines perpendicular to the optical axis and also located as inclining downward at an angle of 30 degrees with respect to the horizontal plane including the sphere center of the convex partial spherical surface of the movable unit. The support balls may be located on lines inclining downward at an angle of 45 degrees with respect to the horizontal plane. In this case, the coefficient of friction between the movable unit and the fixed unit can be decreased, and also the height of the camera driving apparatus can be suppressed low.

The fixed unit may be formed of a plastic resin. In this case, the fixed unit can be integrally molded with the panning tilting, rolling driving coils and the panning, tilting and rolling magnetic yokes. This decreases the cost of the camera driving apparatus.

The movable unit may be formed of a plastic resin. In this case, the movable unit can be integrally molded with the panning tilting, rolling driving coils, the rotation detection magnets and the inclination detection magnet. This decreases the cost of the camera driving apparatus.

The recessed conical surface of the fixed unit and the convex partial spherical surface of the movable unit may be formed of a highly slidable plastic resin. In this case, the coefficient of friction between the movable unit and the fixed unit can be further decreased.

The inclination detector of the movable unit may detect, together with the optical sensor fixed to the fixed unit, a movement caused by an inclination of a pattern printed on a part of the convex partial spherical surface of the movable unit, and thus the two-dimensional tilt angle in the panning and tilting direction may be calculated. This decreases the cost of the camera driving apparatus.

As described above, according to an embodiment of the present invention, the movable unit is supported and driven at the center of gravity by the pivot support structure. Thus, the mechanical resonance can be significantly suppressed in the control frequency range. In addition, a driving and supporting system drivable to slide in the panning direction and the tilting direction at a large angle of ±10 degrees or greater and also drivable to rotate in the rolling direction is used to perform good shake compensation control in a wide frequency range of up to about 50 Hz. Thus, a compact and solid camera driving apparatus capable of compensating for image blurring caused by walk-shake is realized.

Hereinafter, a camera driving apparatus in an embodiment according to the present invention will be described in detail with reference to the drawings.

Embodiment 1

Hereinafter, a camera driving apparatus in Embodiment 1 according to the present invention will be described.

Figure 2:
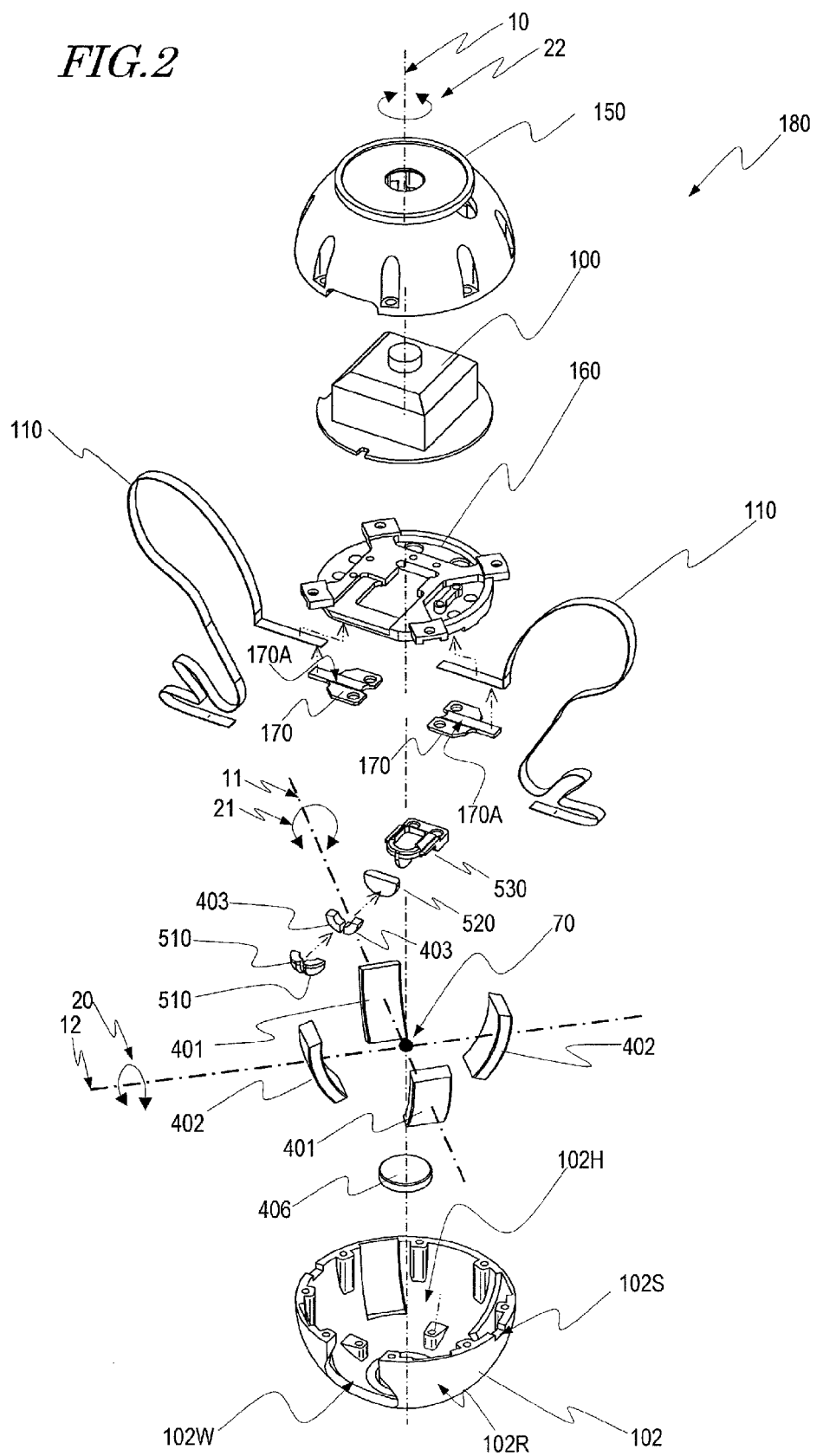
FIG. 2 is an exploded isometric view showing a structure of a lower movable part 102 in Embodiment 1 according to the present invention in detail.
Figure 4A:
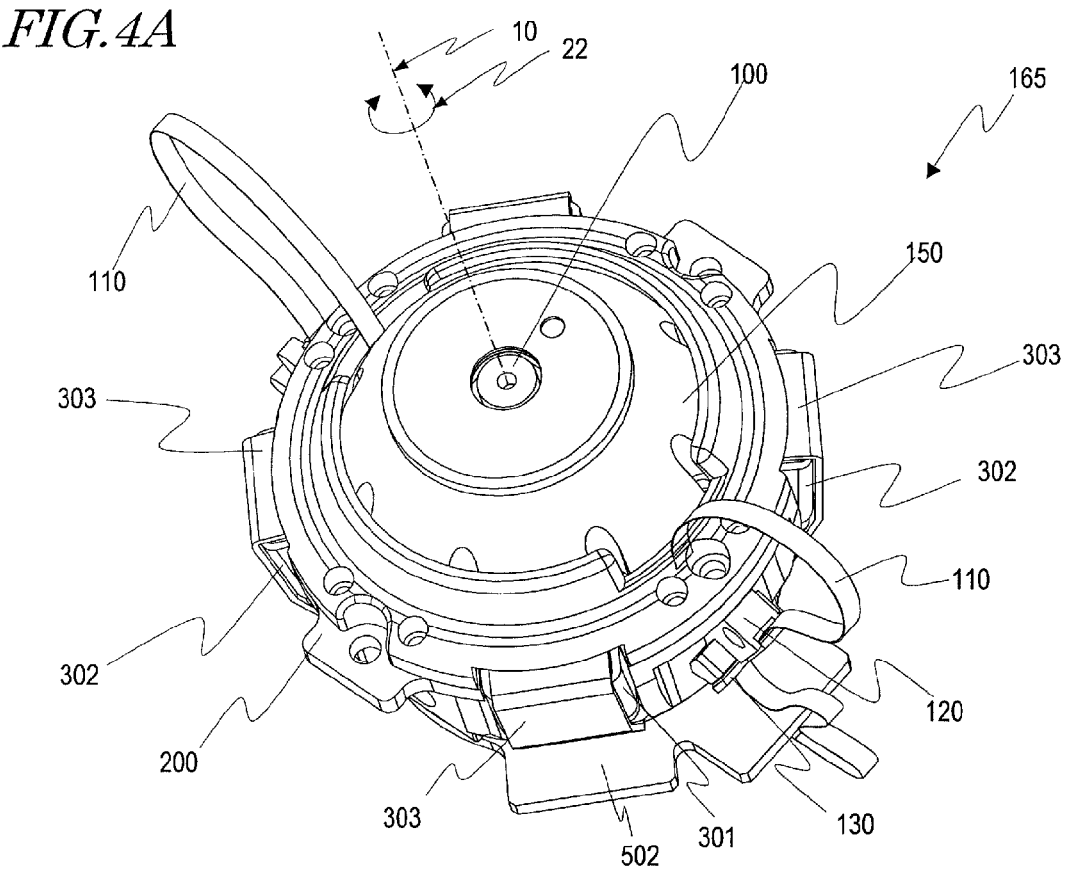
FIG. 4A is an isometric view of Embodiment 1 according to the present invention as seen from above at a different angle.

FIG. 1 and FIG. 2 are each an exploded isometric view of a camera driving apparatus 165 in Embodiment 1 according to the present invention. FIG. 3A and FIG. 4A are each an isometric view of the camera driving apparatus 165 as seen from above obliquely.

Figure 4B:
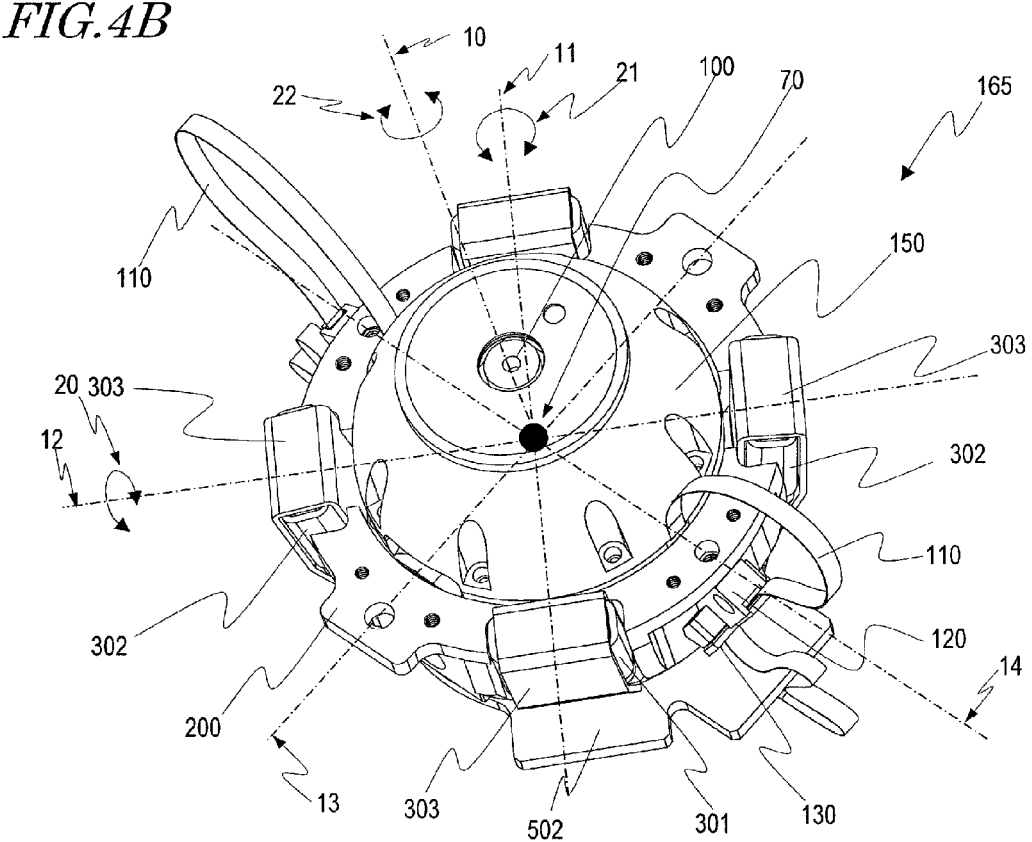
FIG. 4B is an isometric view of Embodiment 1 according to the present invention as seen from above at a different angle in the state where the fall preventive member 201 has been removed.
Figure 4C:
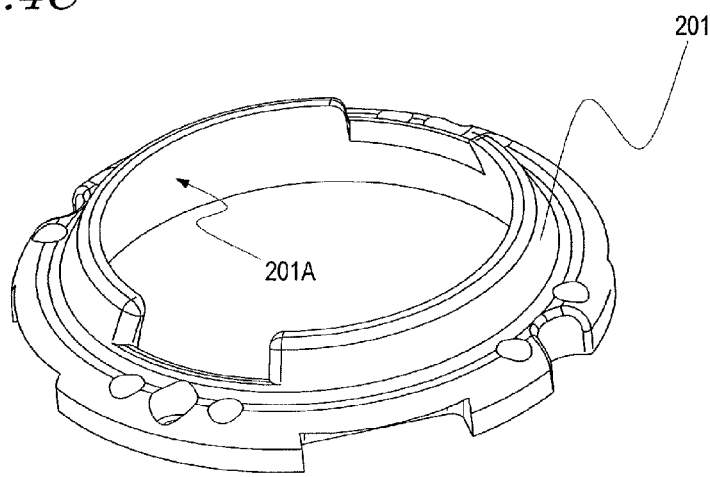
FIG. 4C is an isometric view of the fall preventive member 201 in Embodiment 1 according to the present invention as seen from above.

FIG. 3B and FIG. 4B are each an isometric view of the camera driving apparatus 165 as seen from above obliquely in the state where a part of components thereof, namely, a fall preventive member 201, has been removed.

Figure 5A:
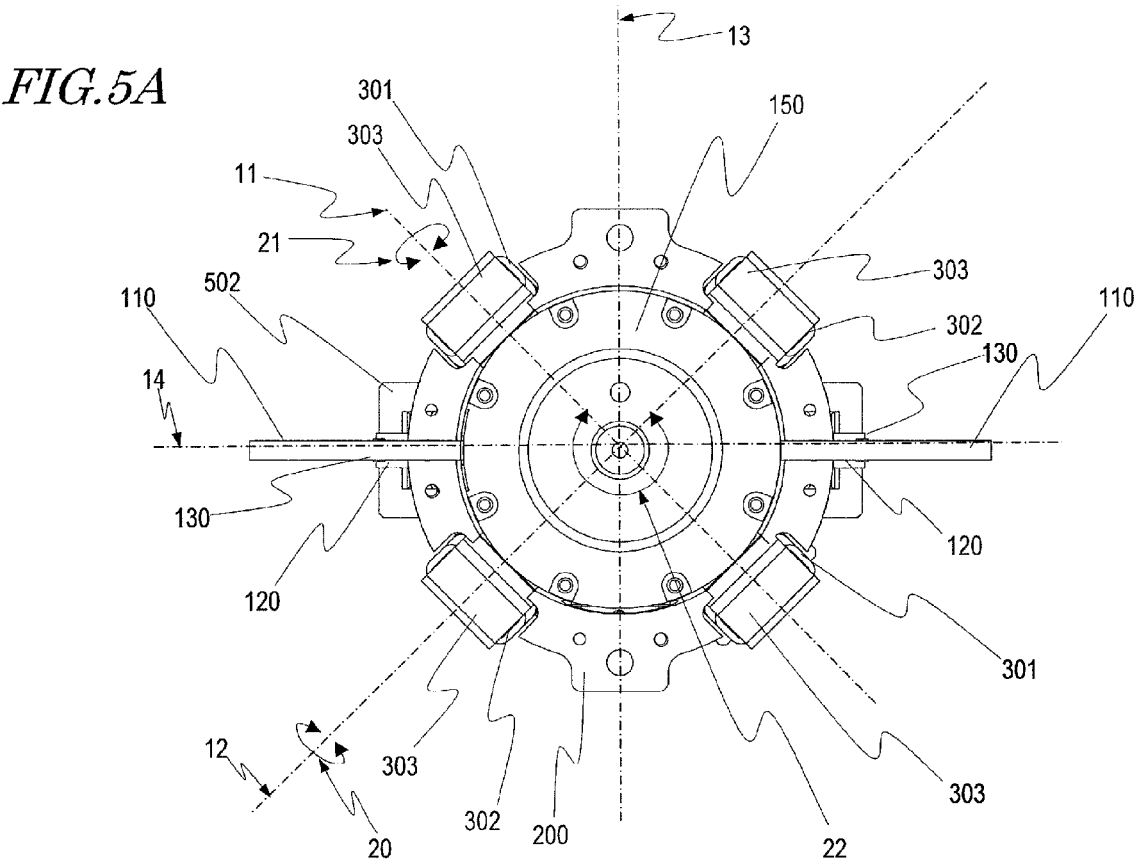
FIG. 5A is a plan view of a camera section 100 in Embodiment 1 according to the present invention as seen from a direction of an optical axis 10 of a lens mounted thereon.
Figure 5B:
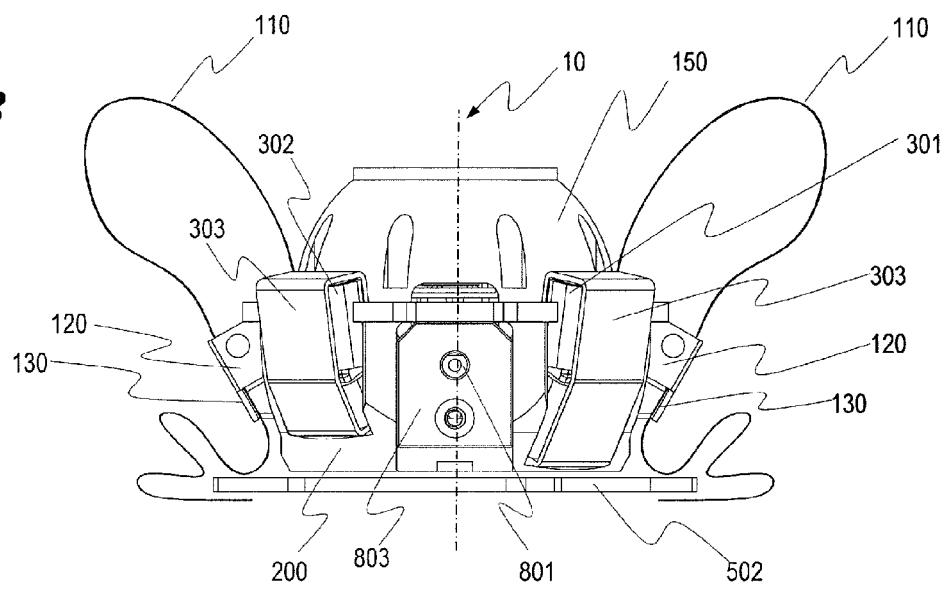
FIG. 5B is a plan view of the camera section 100 in Embodiment 1 according to the present invention as seen from a direction of a straight line 13.

FIG. 5A is a plan view of the camera section 100 as seen from a direction of an optical axis 10 of a lens mounted thereon. FIG. 5B is a plan view of the camera section 100 as seen from a direction of a straight line 13 shown in FIG. 5A.

Figure 6A:
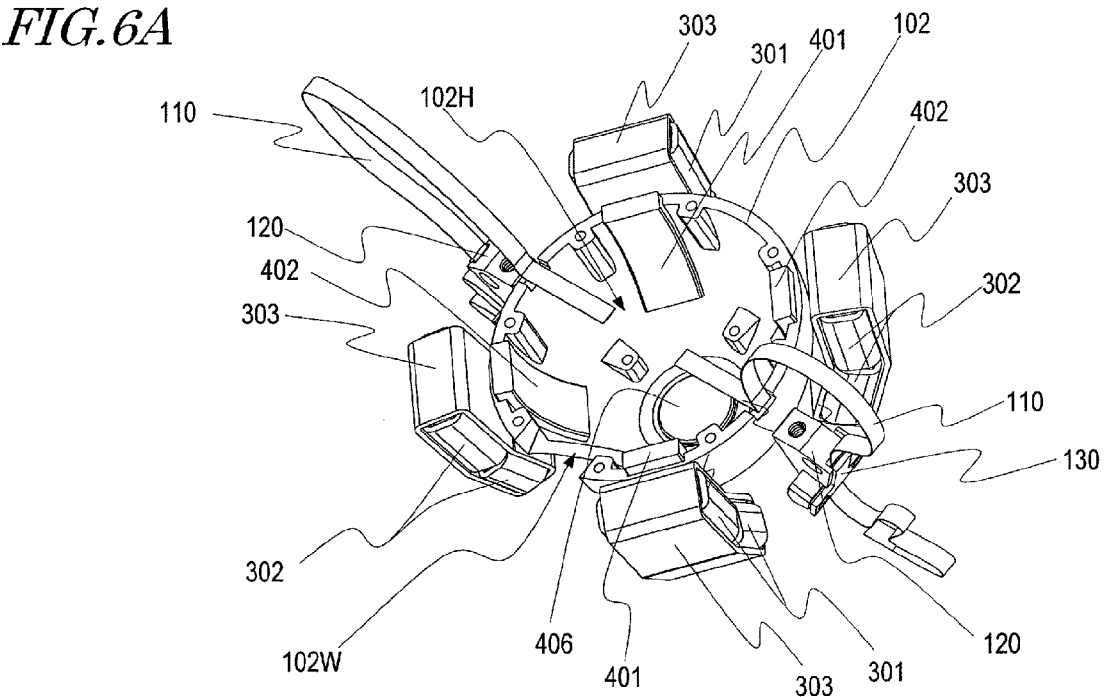
FIG. 6A is an isometric view of a movable unit 180 and a driving section in Embodiment 1 according to the present invention as seen from above in the state where the camera section 100 and a base 200 have been removed.
Figure 6B:
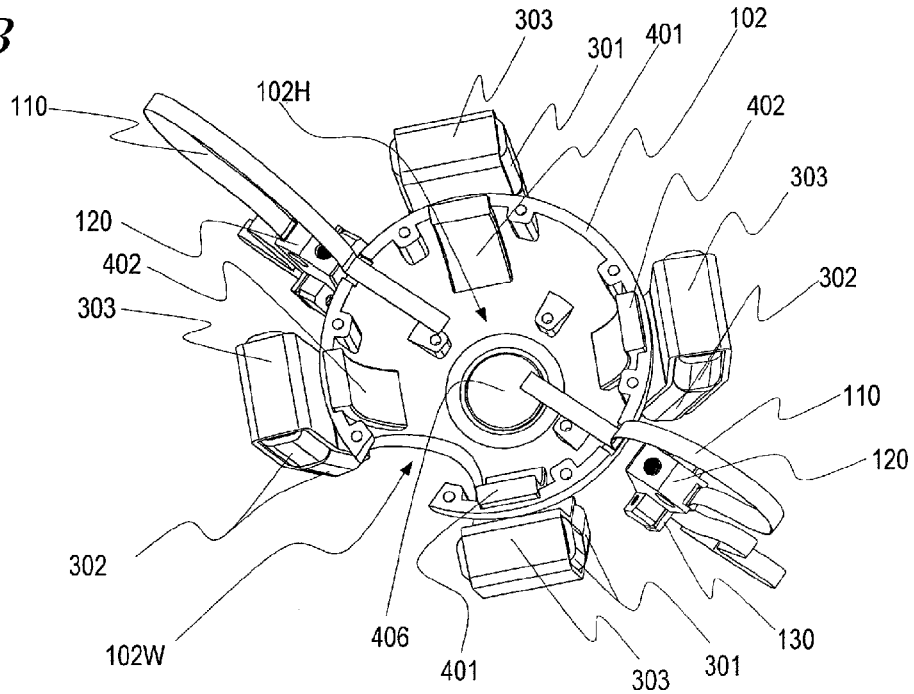
FIG. 6B is an isometric view of the movable unit 180 and the driving section in Embodiment 1 according to the present invention as seen from above at a different angle in the state where the camera section 100 and the base 200 have been removed.

FIG. 6A and FIG. 6B are each an isometric view of a movable unit 180 and a driving section as seen from above in the state where the camera section 100, a camera caver 150 and a base 200 have been removed.

Figure 7:
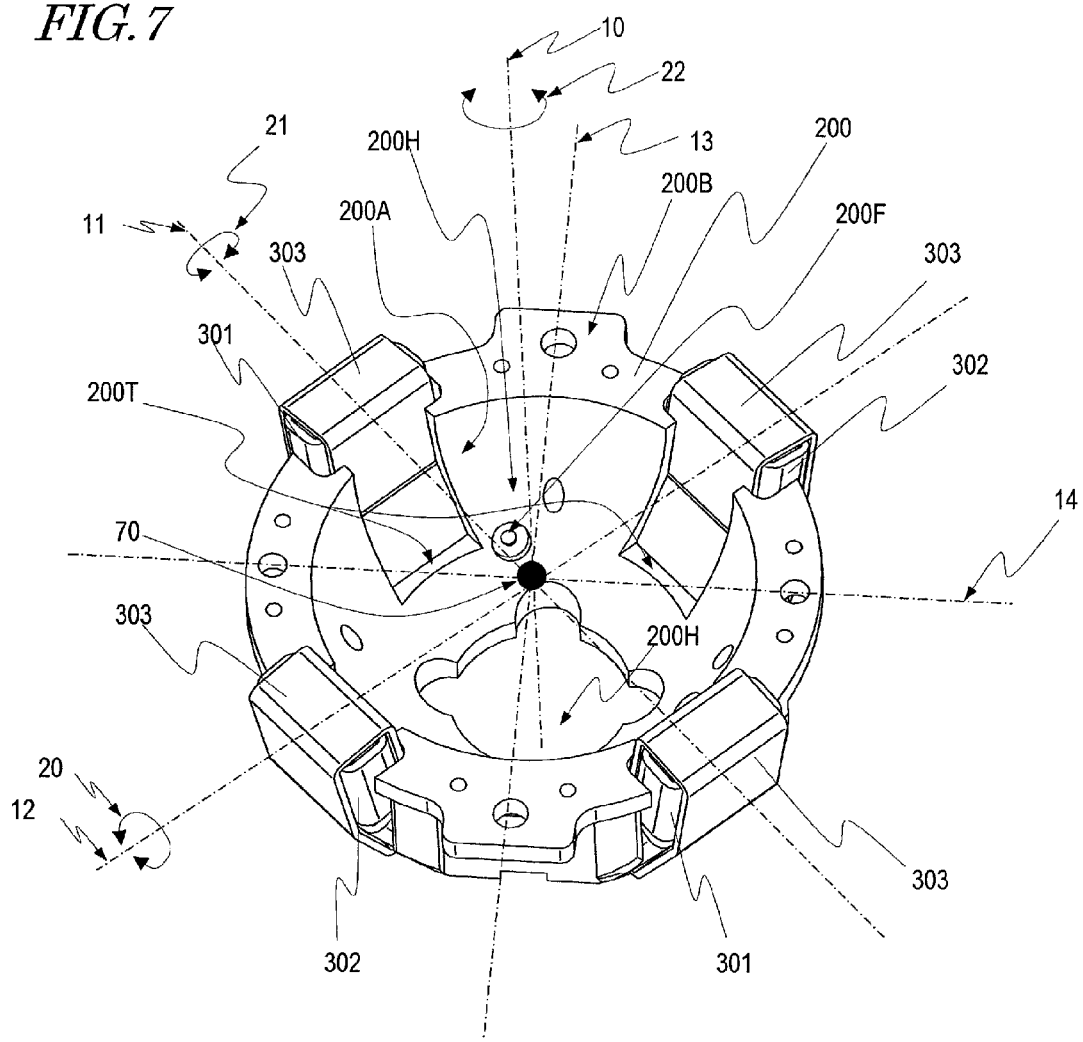
FIG. 7 is an isometric view of a fixed unit in Embodiment 1 according to the present invention as seen from above.

FIG. 7 is an isometric view of a fixed unit as seen from above.

Figure 8:
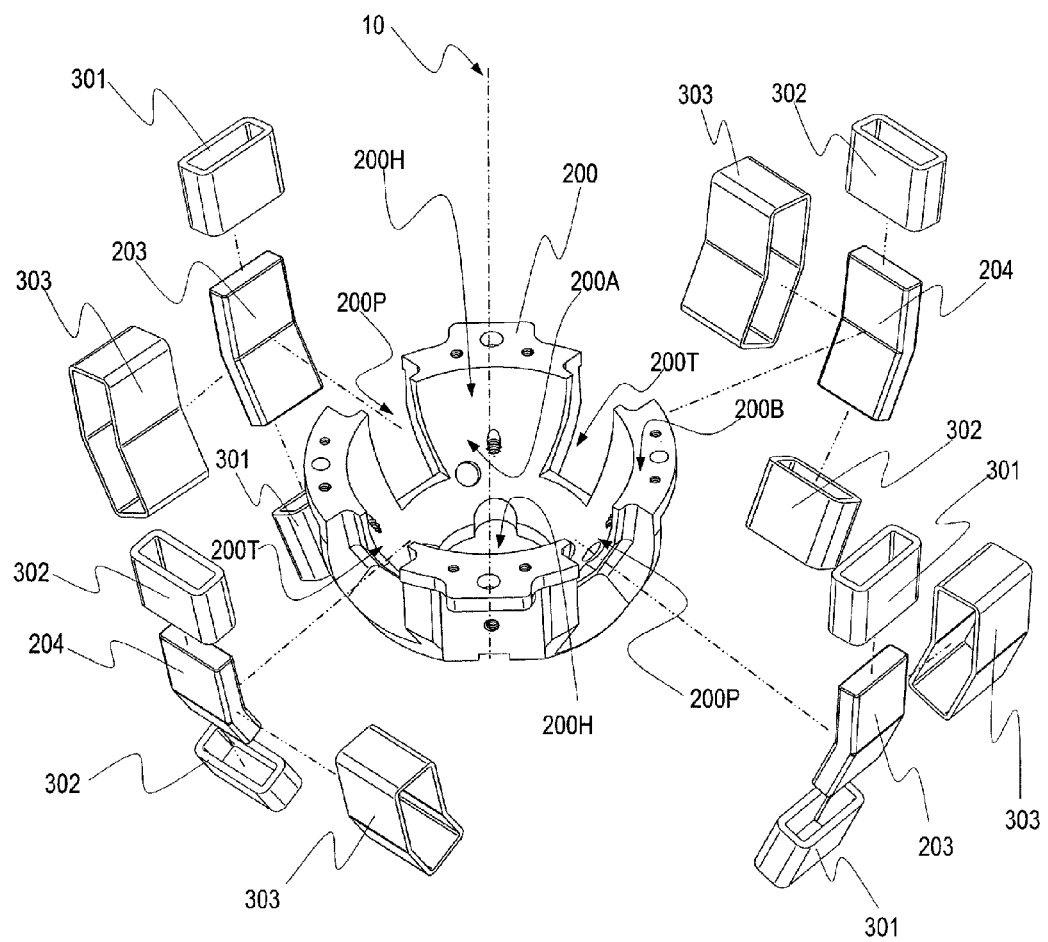
FIG. 8 is an exploded isometric view schematically showing a structure of the fixed unit in Embodiment 1 according to the present invention.

FIG. 8 is an exploded isometric view schematically showing a structure of the fixed unit.

FIG. 9A is a plan view of the camera driving apparatus 165, and FIG. 9B is a cross-sectional view of the camera driving apparatus 165 taken along a plane including the optical axis 10 and a panning direction rotation axis 12.

Figure 10A:
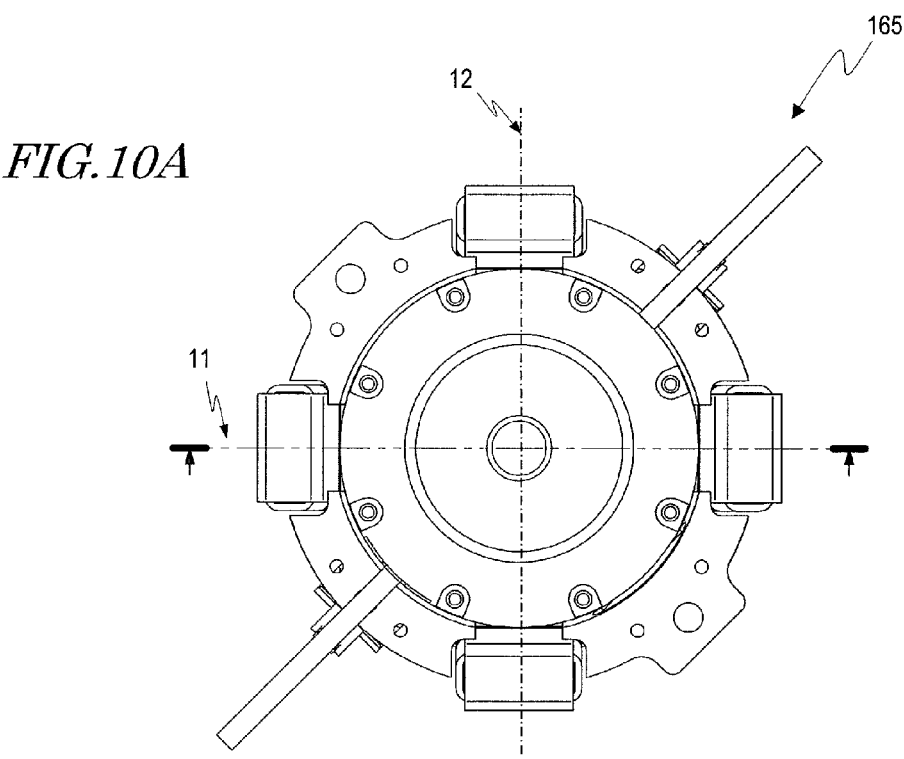
FIG. 10A is a plan view of Embodiment 1 according to the present invention.
Figure 10B:
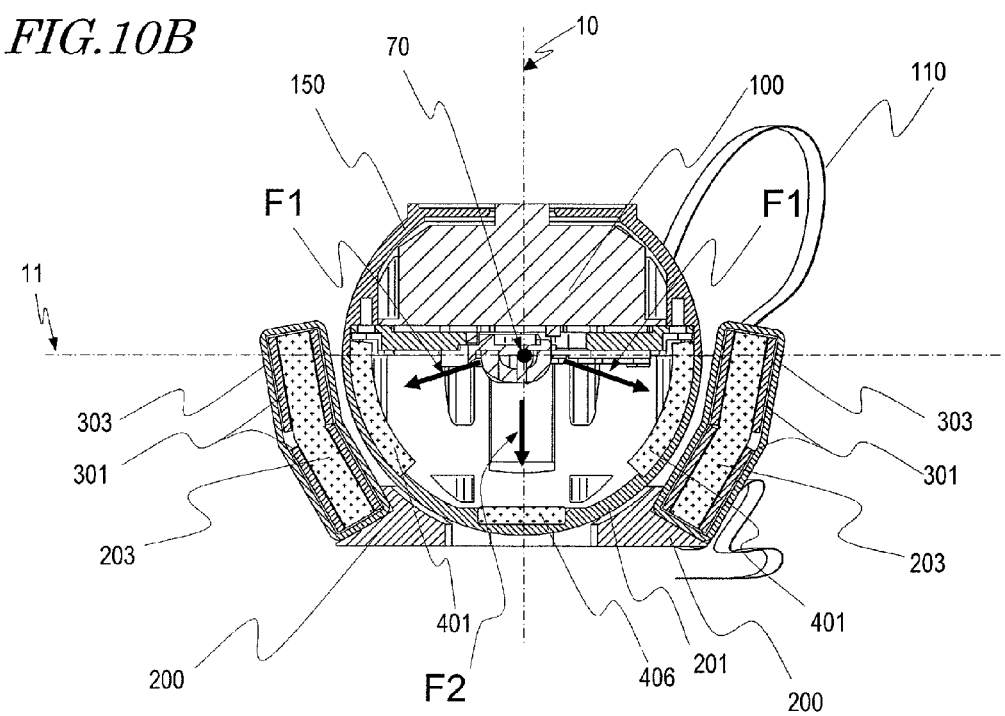
FIG. 10B is a cross-sectional view of the camera driving apparatus 165 in Embodiment 1 according to the present invention taken along a plane including the optical axis 10 and a tilting direction rotation axis 11.

FIG. 10A is a plan view of the camera driving apparatus 165, and FIG. 10B is a cross-sectional view of the camera driving apparatus 165 taken along a plane including the optical axis 10 and a tilting direction rotation axis 11.

Figure 11A:
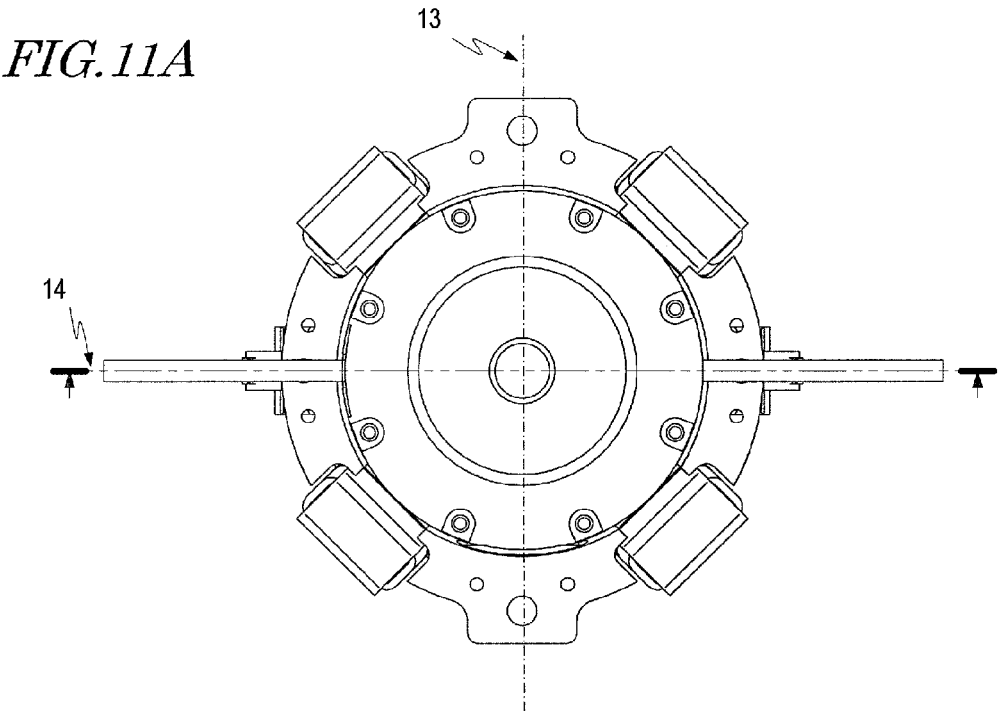
FIG. 11A is a plan view of Embodiment 1 according to the present invention.
Figure 11B:
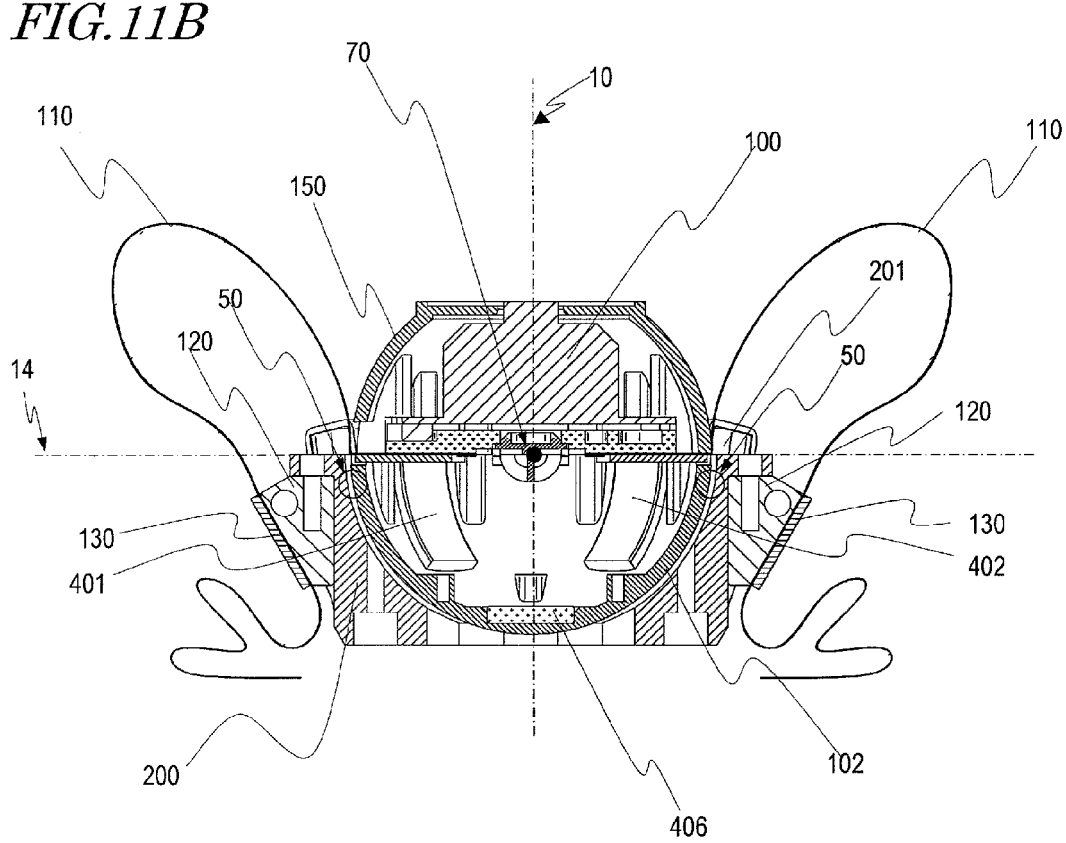
FIG. 11B is a cross-sectional view of the camera driving apparatus 165 in Embodiment 1 according to the present invention taken along a plane including the optical axis 10 and a straight line 14.

FIG. 11A is a plan view of the camera driving apparatus 165, and FIG. 11B is a cross-sectional view of the camera driving apparatus 165 taken along a plane including the optical axis 10 and a straight line 14.

Figure 12A:
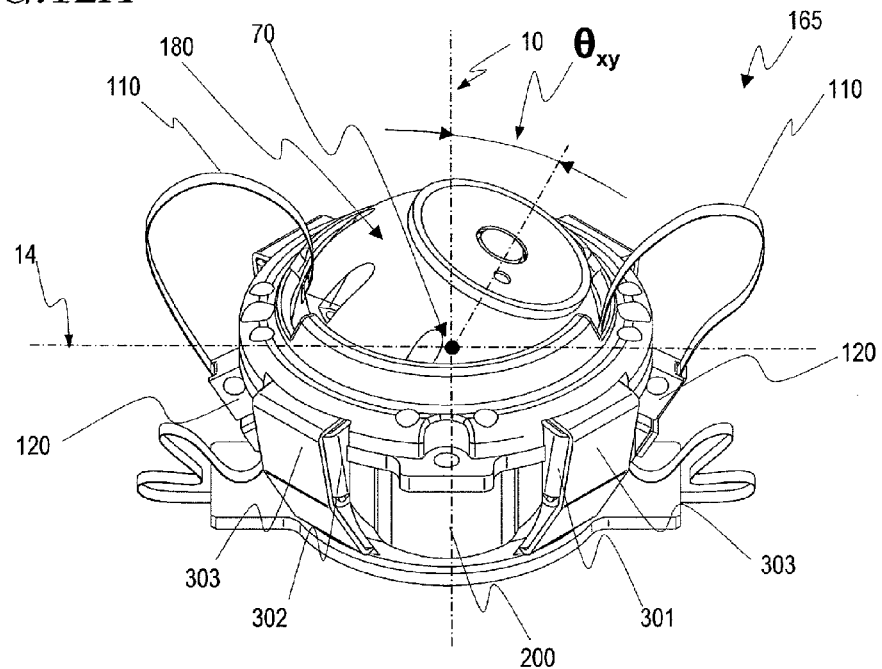
FIG. 12A is an isometric view of Embodiment 1 according to the present invention as seen from above in the state where the movable unit 180 is inclined at a synthesized angle θxy, namely, inclined in a panning direction 20 and a tilting direction 21 by an identical angle.
Figure 12B:
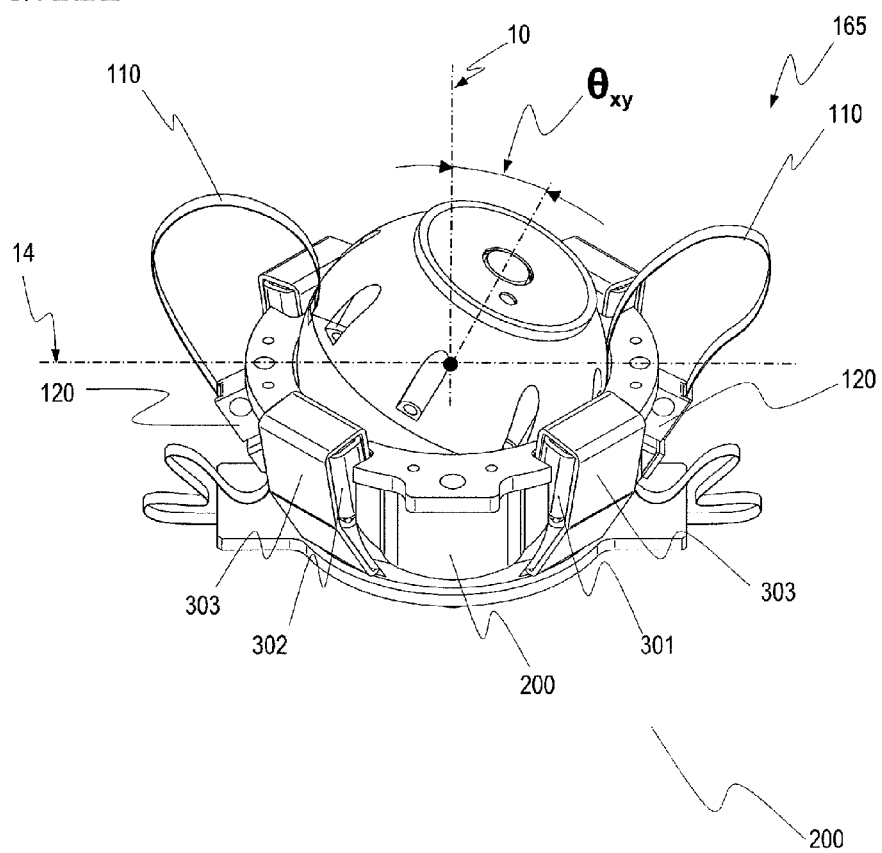
FIG. 12B is an isometric view of Embodiment 1 according to the present invention as seen from above in the state where the movable unit 180 is inclined at the synthesized angle θxy, namely, inclined in the panning direction 20 and the tilting direction 21 by an identical angle and the fall preventive member 201 has been removed.

FIG. 12A is an isometric view of the camera section 100 as seen from above in the state of being inclined at a synthesized angle θxy, namely, inclined in a panning direction 20 and a tilting direction 21 by an identical angle. FIG. 12B is an isometric view of the camera section 100 as seen from above in the state of being inclined at the synthesized angle θxy, namely, inclined in the panning direction 20 and the tilting direction 21 by an identical angle. In FIG. 12B, the fall preventive member 201 has been removed.

Figure 13A:
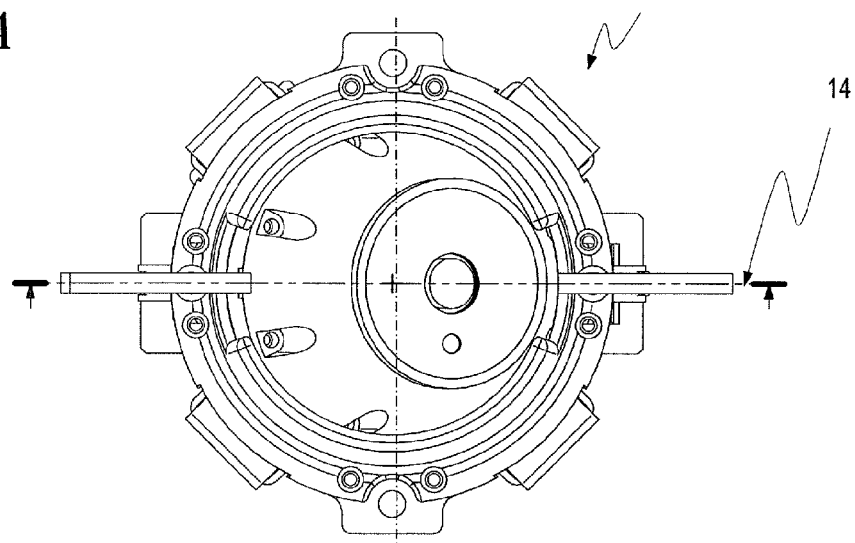
FIG. 13A is a plan view of Embodiment 1 according to the present invention.
Figure 13B:
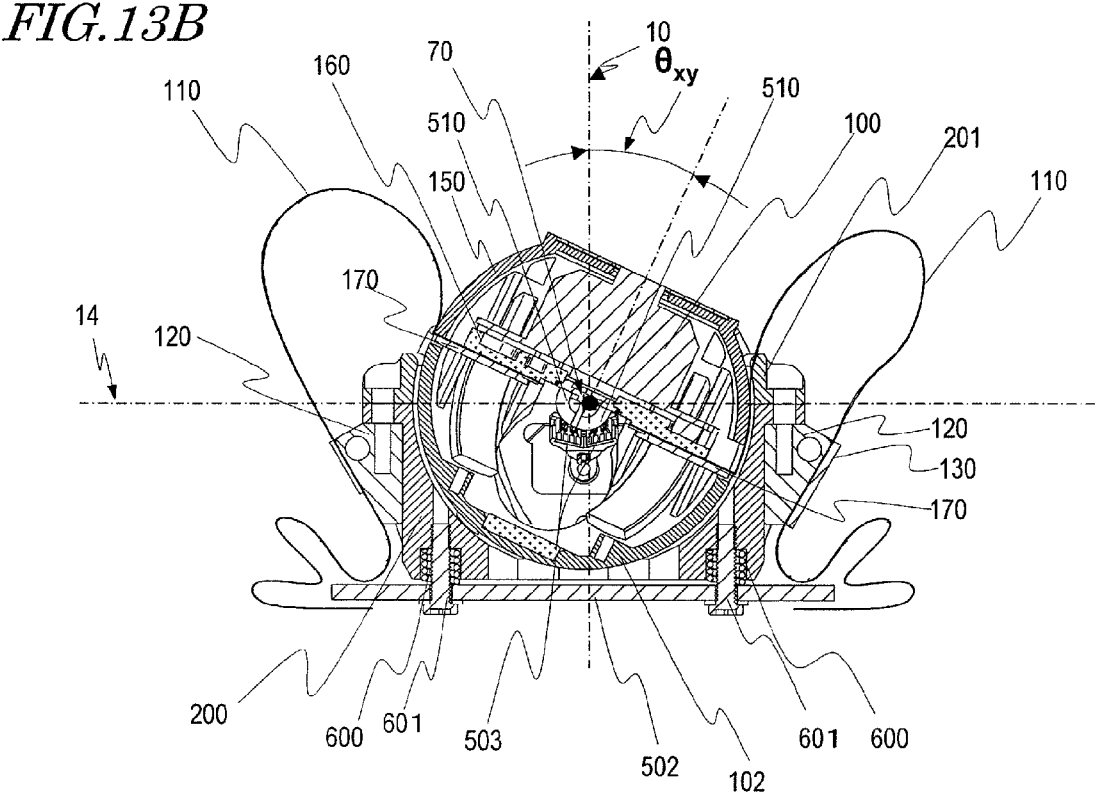
FIG. 13B is a cross-sectional view of Embodiment 1 according to the present invention taken along a plane including the optical axis 10 and the straight line 14 in the state where the movable unit 180 is inclined at the synthesized angle θxy, namely, inclined in the panning direction 20 and the tilting direction 21 by an identical angle.

FIG. 13A is a plan view of the camera driving apparatus 165, and FIG. 13B is a cross-sectional view of the camera driving apparatus 165 taken along a plane including the optical axis 10 and the straight line 14. In FIG. 13A and FIG. 13B, the camera section 100 is in the state of being inclined at the synthesized angle θxy, namely, inclined in the panning direction 20 and the tilting direction 21 by an identical angle.

Figure 14:
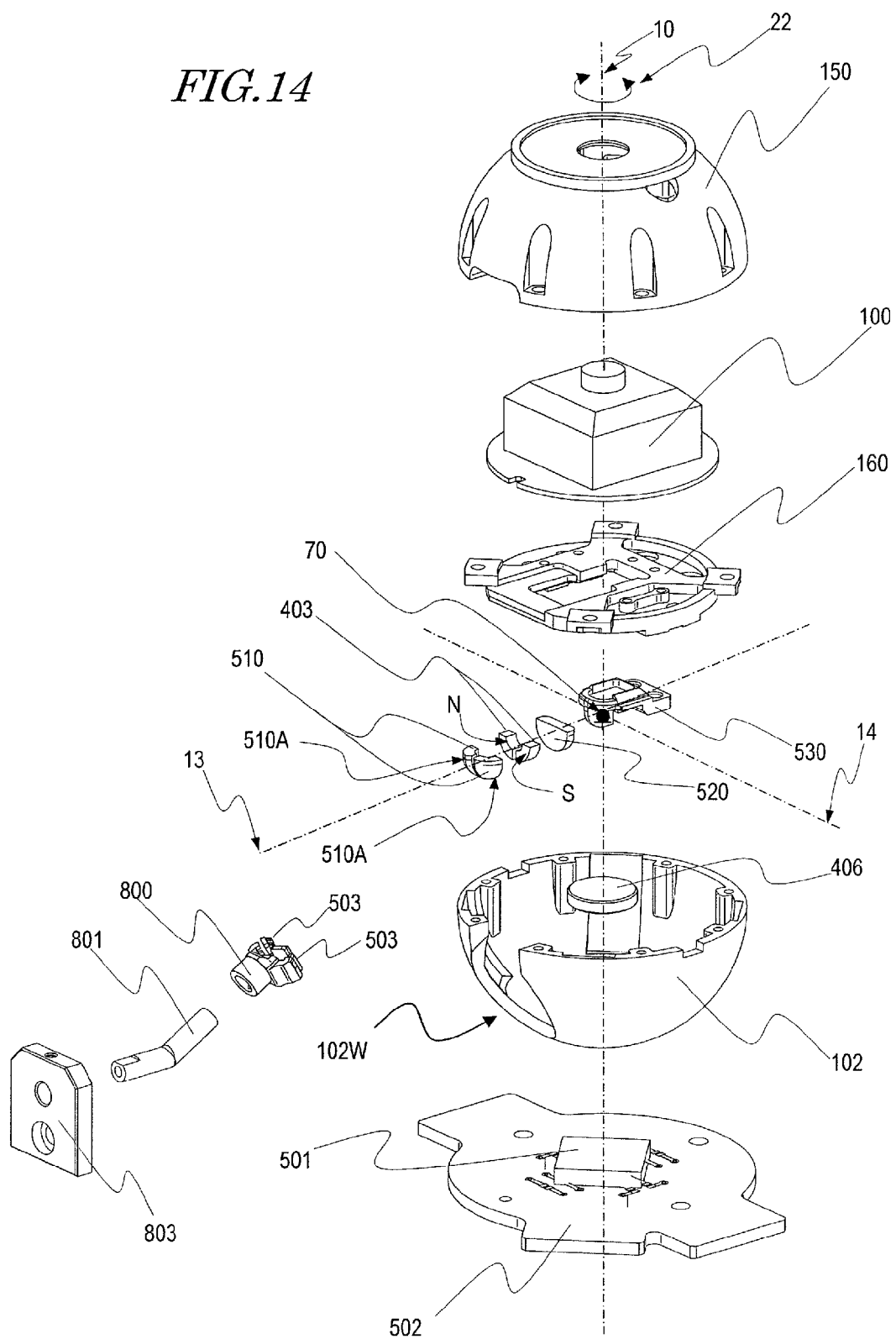
FIG. 14 is an exploded isometric view of an inclination detector and a rotation detector in Embodiment 1 according to the present invention as seen from above.

FIG. 14 is an exploded isometric view of an inclination detector and a rotation detector.

Figure 15:
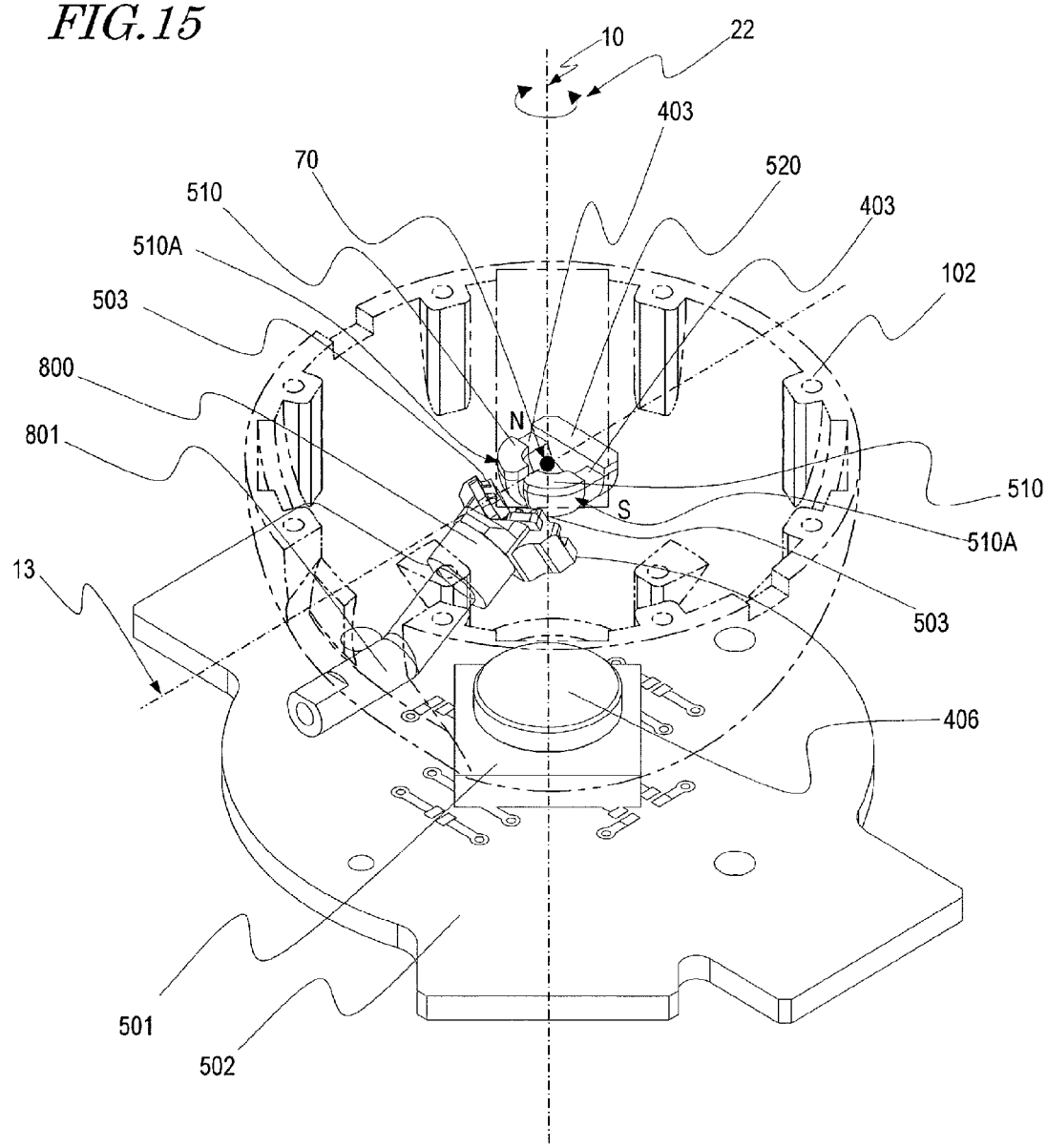
FIG. 15 is an isometric view of the inclination detector and the rotation detector in Embodiment 1 according to the present invention as seen from above.

FIG. 15 is an isometric view of the inclination detector and the rotation detector in Embodiment 1 according to the present invention as seen from above.

Figure 16A:
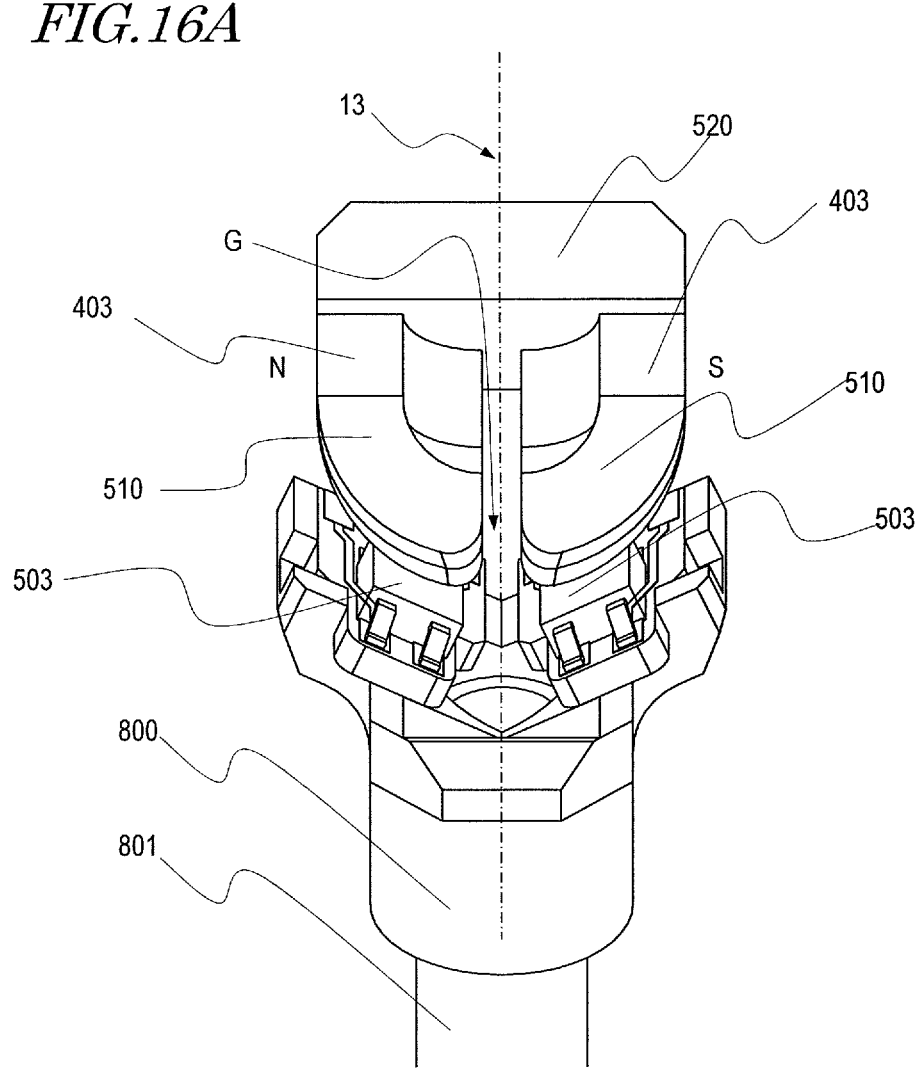
FIG. 16A is an isometric view of the rotation detector in Embodiment 1 according to the present invention as seen from above.
Figure 16B:
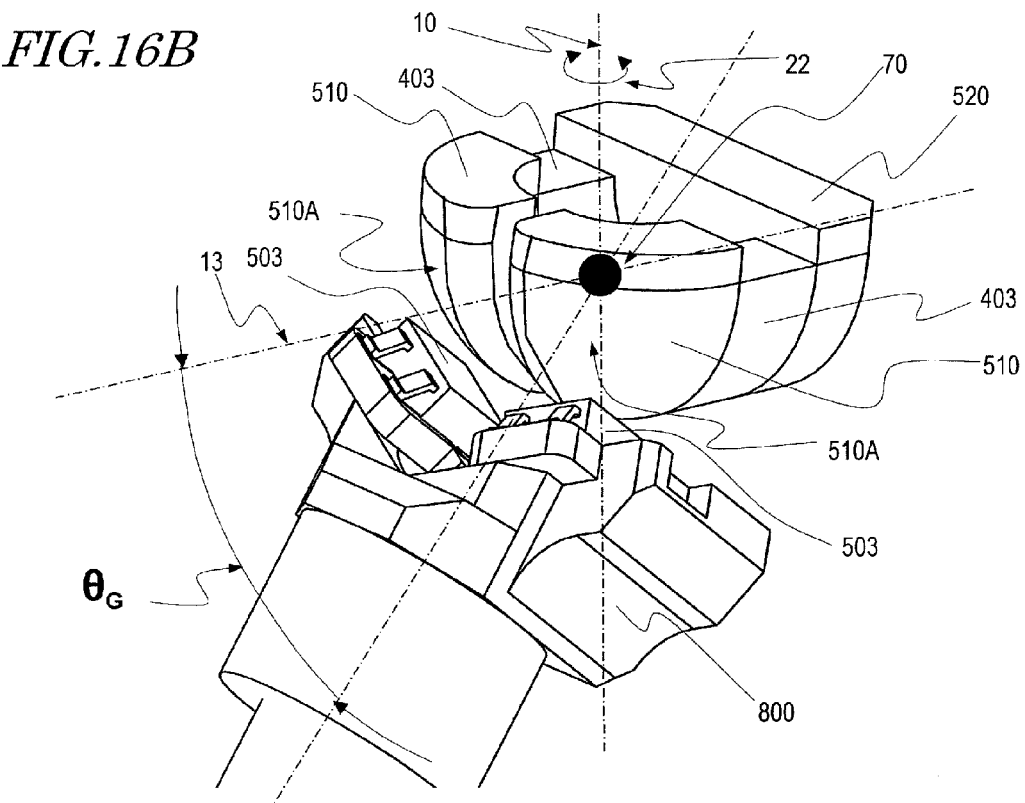
FIG. 16B is an isometric view of the rotation detector in Embodiment 1 according to the present invention as seen from above at a different angle.

FIG. 16A and FIG. 16B are each an isometric view of the rotation detector in Embodiment 1 according to the present invention as seen from above. FIG. 16A and FIG. 16B show the isometric views as seen at different angles from each other.

Figure 17A:
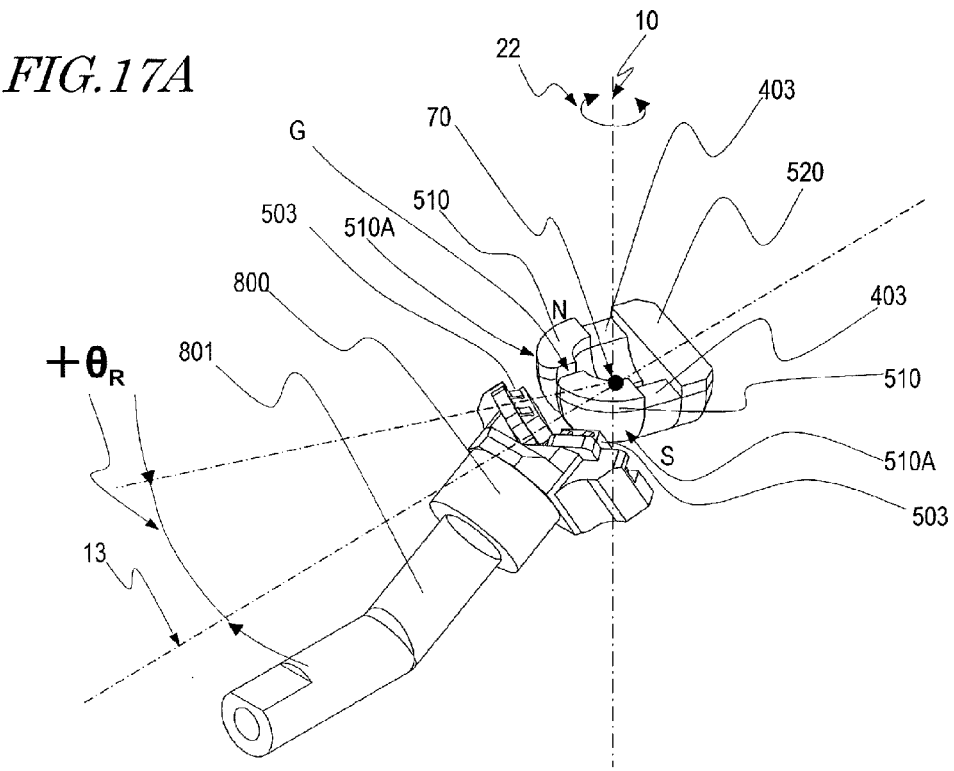
FIG. 17A is an isometric view of the rotation detector in Embodiment 1 according to the present invention as seen from above in the state of being rotated at an angle of +θ$_R$ in a rolling direction 22.
Figure 17B:
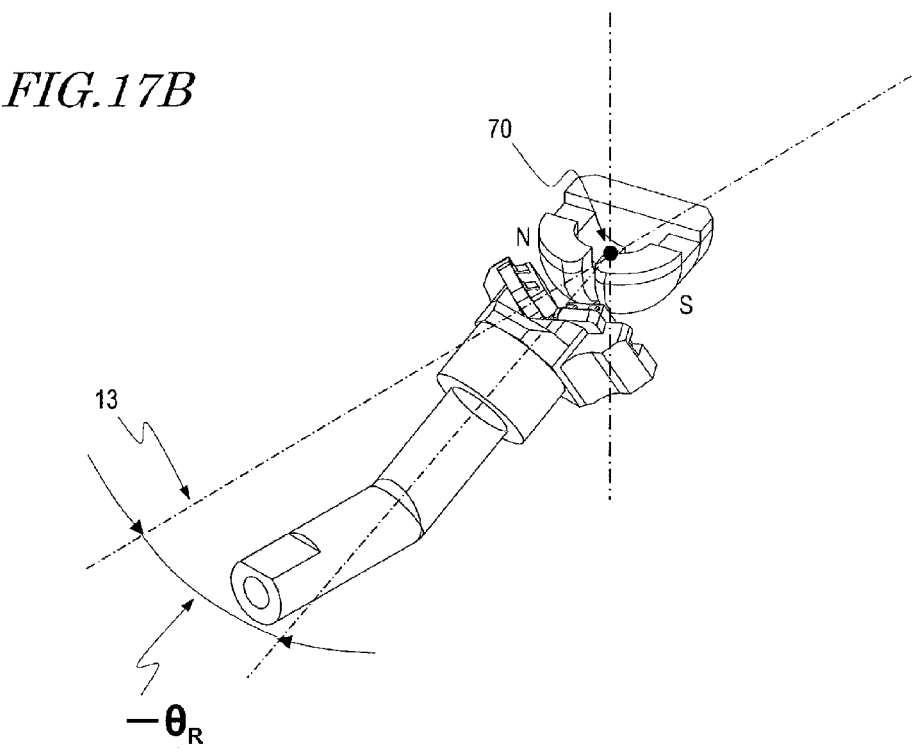
FIG. 17B is an isometric view of the rotation detector in Embodiment 1 according to the present invention as seen from above in the state of being rotated at an angle of −θ$_R$ in the rolling direction 22.

FIG. 17A is an isometric view of the rotation detector as seen from above in the state of being rotated at an angle of +θxy in a rolling direction 22. FIG. 17B is an isometric view of the rotation detector as seen from above in the state of being rotated at an angle of −θxy in the rolling direction 22.

Figure 18:
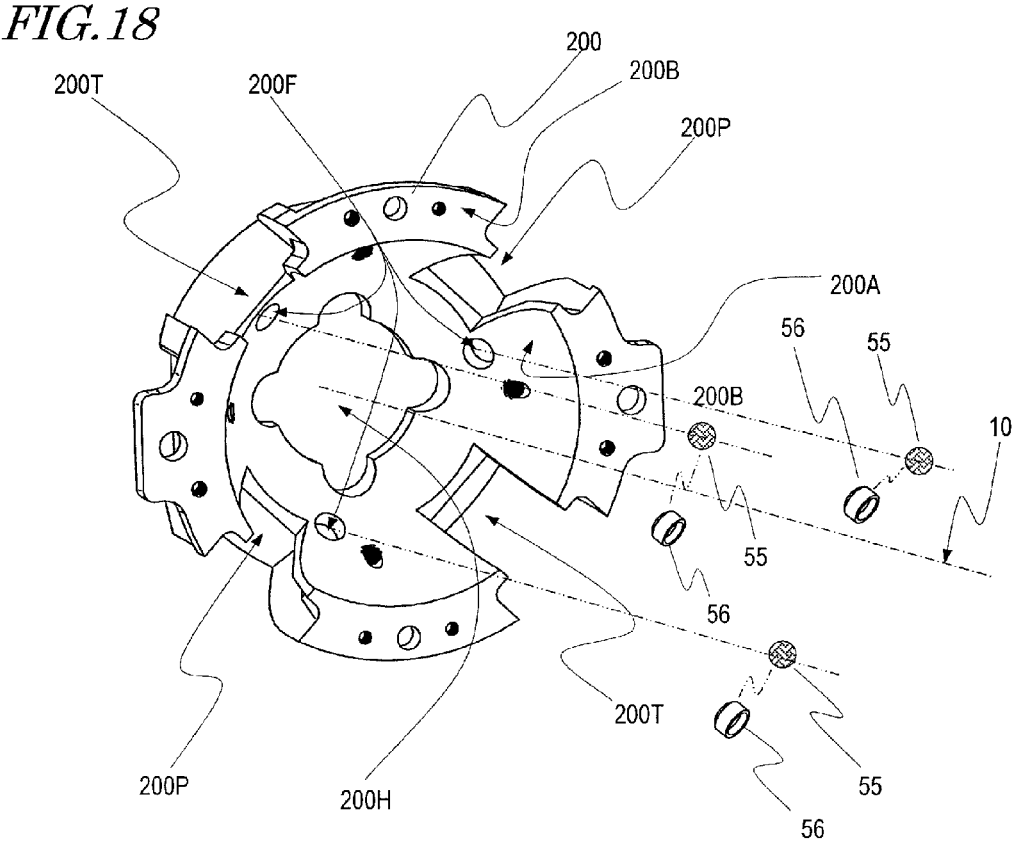
FIG. 18 is an exploded isometric view showing the positional relationship between the fixed unit and support balls 55 in Embodiment 1 according to the present invention.

FIG. 18 is an exploded isometric view showing the positional relationship between the fixed unit and support balls 55.

Figure 19B:
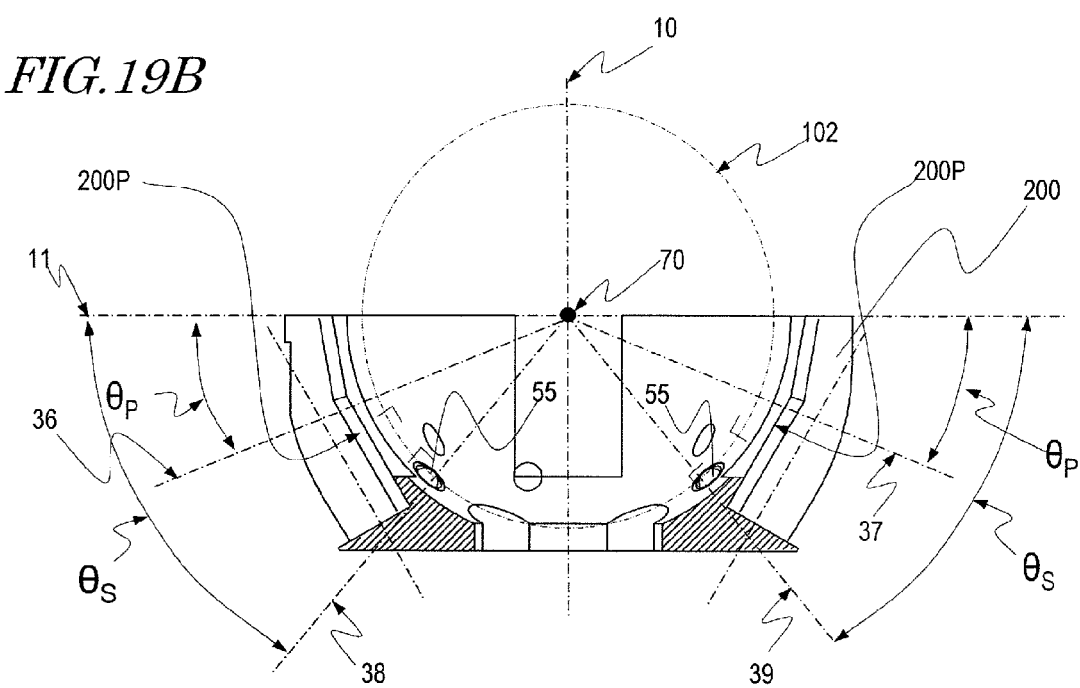
FIG. 19B is a cross-sectional view of the fixed unit in Embodiment 1 according to the present invention taken along a plane including the optical axis 10 and the tilting direction rotation axis 11.

FIG. 19A is a plan view of the fixed unit, and FIG. 19B is a cross-sectional view of the fixed unit taken along a plane including the optical axis 10 and the tilting direction rotation axis 11.

Figure 20A:
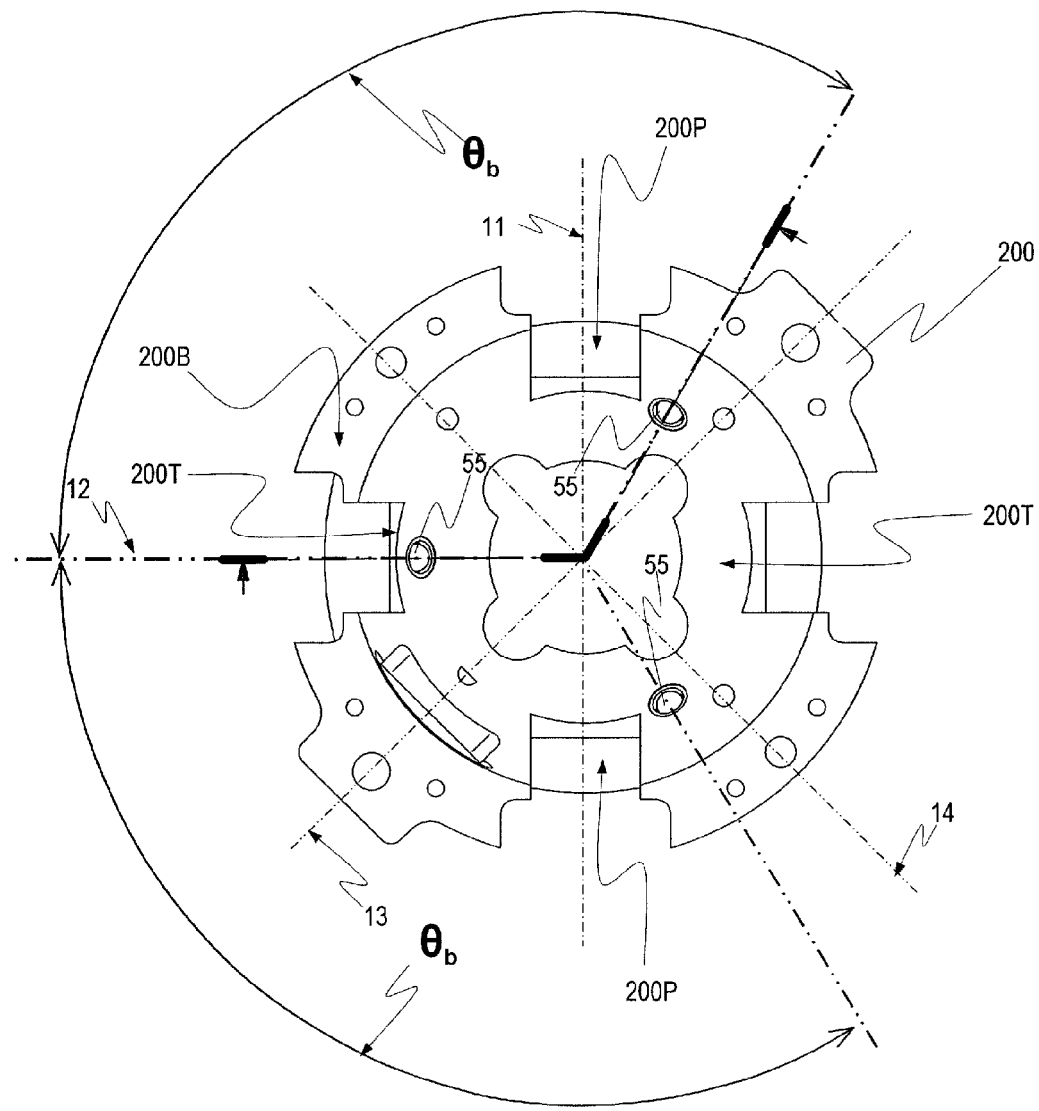
FIG. 20A is a plan view of the fixed unit in Embodiment 1 according to the present invention.
Figure 20B:
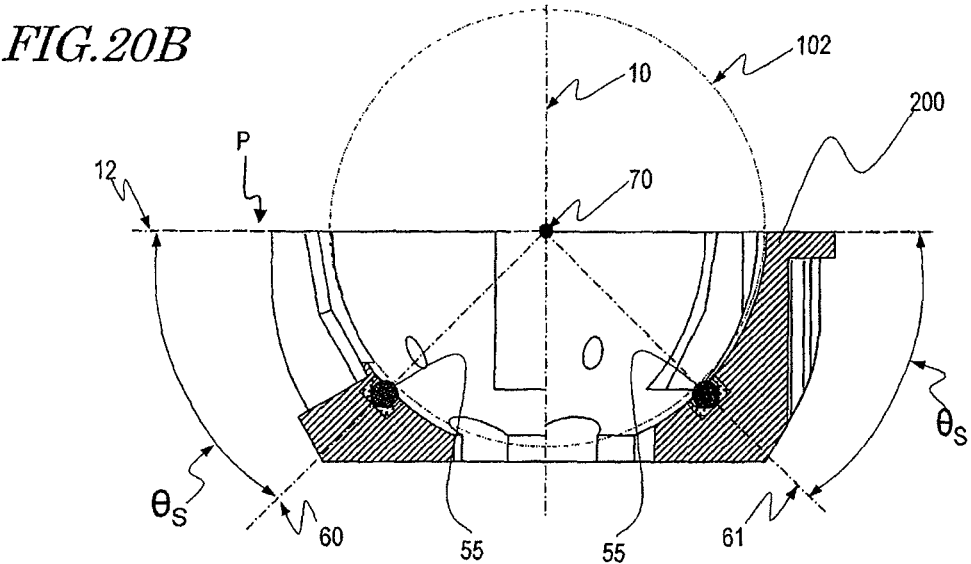
FIG. 20B is a rotational cross-sectional view of the fixed unit taken in Embodiment 1 according to the present invention along a plane including the optical axis 10 and centers of the support balls 55.

FIG. 20A is a plan view of the fixed unit, and FIG. 20B is a rotational cross-sectional view of the fixed unit taken along a plane including the optical axis 10 and centers of the support balls 55.

Figure 21A:
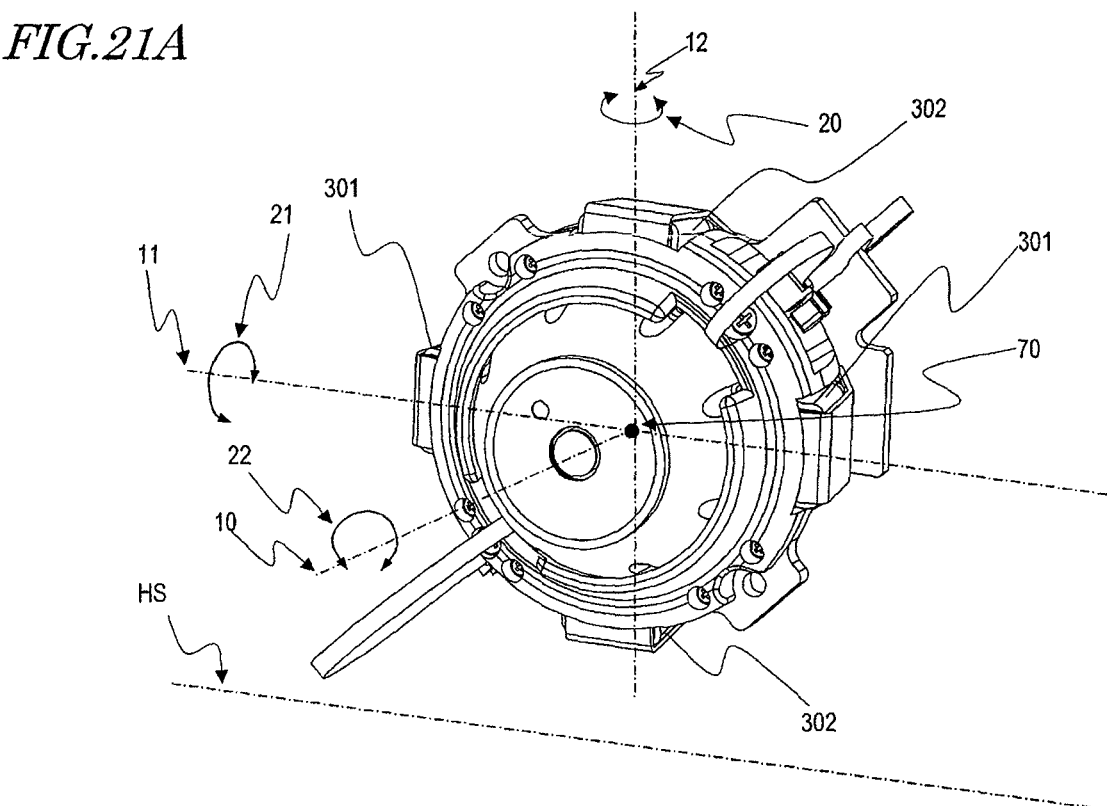
FIG. 21A is an isometric view of the camera driving apparatus in Embodiment 1 according to the present invention as seen from above, which shows a relative angular position thereof with respect to a horizontal photographing reference.
Figure 21B:
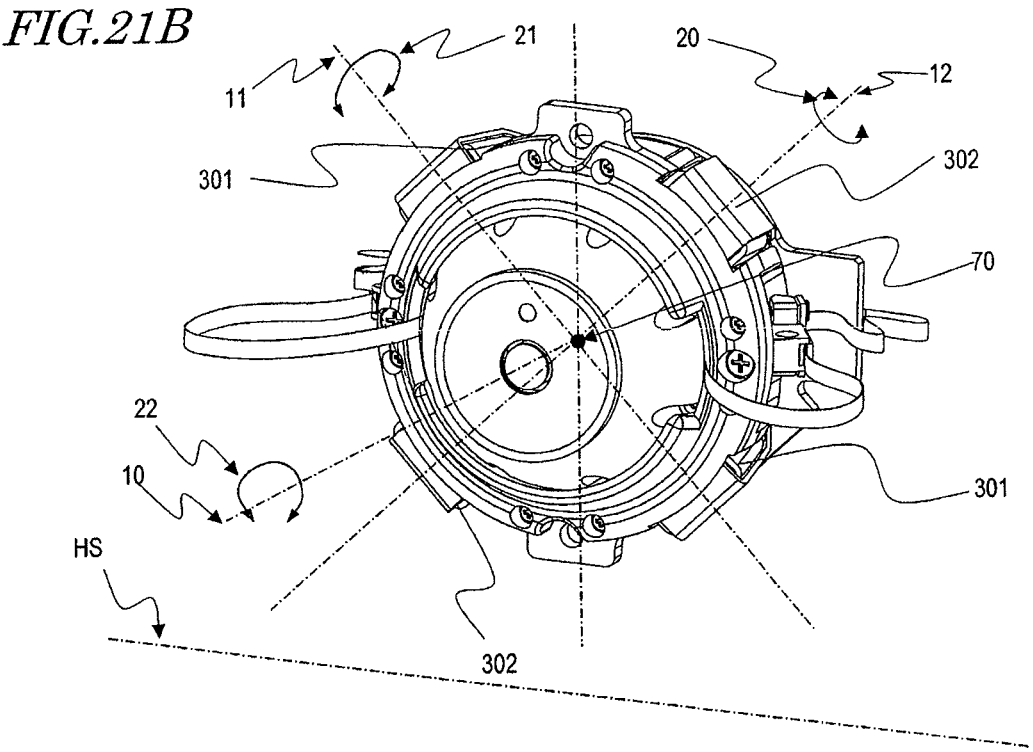
FIG. 21B is another isometric view of the camera driving apparatus in Embodiment 1 according to the present invention as seen from above, which shows a relative angular position thereof with respect to the horizontal photographing reference.

FIG. 21A and FIG. 21B are each an isometric view of the camera driving apparatus as seen from above, which shows a relative angular position thereof with respect to a horizontal photographing reference.

With reference to there figures, a main structure of the camera driving apparatus 165 will be described.

The camera driving apparatus 165 includes the camera section 100, the movable unit 180 having the camera section 100 built therein, and a fixed unit for supporting the movable unit 180. With respect to the fixed unit, the movable unit 180 is freely rotatable in the rolling direction 22 around the optical axis 10 of a lens (not shown) as the center of rotation, in a titling direction 21 around the tilting direction rotation axis 11 as the center of rotation, and in the panning direction 20 around the panning direction rotation axis 12 as the center of rotation. The tilting direction rotation axis 11 and the panning direction rotation axis 12 are perpendicular to each other.

For freely rotating the movable unit 180 as described above, the camera driving apparatus 165 includes a panning driving section for inclining the movable unit 180 in the panning direction 20, a tilting driving section for inclining the movable unit 180 in the tilting direction 21, and a rolling driving section for rotating the camera section 100 in the rolling direction 22 around the optical axis 10 of a lens with respect to the fixed unit.

The panning driving section includes a pair of panning driving magnets 401, a pair of panning driving coils 301, and a pair of panning magnetic yokes 203. The pair of panning magnetic yokes 203 are each formed of a magnetic member. The pair of panning driving coils 301 are respectively wound around by a pair of rolling driving coils 303 described later. The pair of rolling driving coils 303 are usable to drive the camera section 100 to rotate in the rolling direction 22 around the optical axis 10.

The tilting driving section includes a pair of tilting driving magnets 402, a pair of tilting driving coils 302, and a pair of tilting magnetic yokes 204. The pair of tilting magnetic yokes 204 are each formed of a magnetic member. The pair of tilting driving coils 302 are respectively wound around by another pair of rolling driving coils 303 described later. The pair of rolling driving coils 303 are usable to drive the camera section 100 to rotate in the rolling direction 22 around the optical axis 10.

The driving of the movable unit 180 by the panning, tilting and rolling driving sections will be described later in detail.

The camera driving apparatus 165 includes detectors for detecting a tilt angle of the movable unit 180, having the camera section 100 mounted thereon with respect to the fixed unit and for detecting a rotation angle of the movable unit 180 around the optical axis 10 of the lens with respect to the fixed unit. Specifically, the camera driving apparatus 165 includes a first detector for detecting a two-dimensional tilt angle of the movable unit 180, namely, a rotation angle thereof in the panning direction 20 and the tilting direction 21, and a second detector for detecting a tilt angle of the movable unit 180 around the optical axis 10 of the lens. The first detector includes a first magnetic sensor 501 and an inclination detection magnet 406. The second detector includes a magnetic circuit including a pair of rotation detection magnets 403 provided in the vicinity of a sphere center 70 of the movable unit 180, a pair of spherical-surface yokes 510 each having a spherical surface 510A, and a back yoke 520, and also includes a pair of second magnetic sensors 503 fixed to the base 200. The detectors will be described later in detail.

As shown in FIG. 1 and FIG. 2, the camera section 100 includes an imaging element (not shown), the lens (not shown) having the optical axis 10 for forming an image of a subject on an imaging plane of the imaging element, and a lens barrel (not shown) for holding the lens. The camera section 100 is connected to lines 110 for outputting an output signal from the camera section 100 to an external component. The lines 110 are formed of, for example, flexible cables.

The fixed unit includes the base 200. The base 200 has a recess which is loosely fitted with at least a part of the movable unit 180. In this embodiment, an inner surface of the recess is formed of a recessed spherical surface 200A. The base 200 further has openings 200P and 200T, and a contact surface 200B.

As shown in FIG. 1 through FIG. 8, in order to rotate the movable unit 180 in the rolling direction 22, the camera driving apparatus 165 uses both of the pair of panning magnetic yokes 203 and the pair of tilting magnetic yokes 204 as the rolling magnetic yokes, and includes the four rolling driving coils 303 respectively wound around these rolling magnetic yokes. The camera driving apparatus 165 uses both of the pair of panning driving magnets 401 and the pair of tilting driving magnets 402 as the rolling driving magnets.

As shown in FIG. 7 and FIG. 8, the rolling driving coils 303 are respectively wound around the pair of panning magnetic yokes 203 and the pair of tilting magnetic yokes 204. The rolling driving coils 303 are wound in a cross-winding manner, namely, in a direction perpendicular to a direction in which the panning driving coils 301 and the tilting driving coils 302 are wound. The rolling driving coils 303 are respectively inserted and fixed to the openings 200P and 200T of the base 200.

Preferably, the fixed unit including the base 200 is formed of a resin. More preferably, the fixed unit including the base 200 is integrally molded with the panning driving coils 301 and the rolling driving coils 303 wound around the pair of panning magnetic yokes 203 and with the tilting driving coils 302 and the rolling driving coils 303 wound around the pair of tilting magnetic yokes 204. It is preferable that the driving coils wound around these magnetic yokes are not exposed to the inner surface of the base 200, namely, the recessed spherical surface 200A.

The movable unit 180 includes the camera cover 150 and a lower movable part 102. The camera cover 150 having the camera section 100 built therein is fixed to the lower movable part 102.

The lower movable part 102 has a pot shape having an opening 102H. The lower movable part 102 has a convex partial spherical surface 102R along an outer surface thereof. The convex partial spherical surface 102R merely needs to be at least a part of a spherical surface, or may be the entirety of a spherical surface. The convex partial spherical surface 102R has the sphere center 70. As shown in FIG. 18, FIG. 19B and FIG. 20B, the convex partial spherical surface 102R of the lower movable part 102 is in point contact with three support balls 55 which are respectively fit, via resin support ball holders 56, into three cylindrical recesses 200F provided in the recessed spherical surface 200A of the inner surface of the base 200.

The convex partial spherical surface 102R covers the entire outer surface of the lower movable part 102. More specifically, the lower movable part 102 has an opening 102W, into which a coupling rod (holder bar) 801 described later can be inserted. The coupling rod 801 is included in the second detector. The opening 102W has a size which is set such that the coupling rod 801 does not contact the lower movable part 102 in any part of the range in which the movable unit 180 is inclinable and rotatable. The opening 102W is used as a stopper for stopping the movable unit 180 in the rotation direction 22. In this manner, the surface of the lower movable part 102 other than the opening 102W forms the convex partial spherical surface 102R.

The sphere center 70 of the convex partial spherical surface 102R is located at a position which is substantially the center of the lower movable part 102 and is below the camera section 100.

In order to position the lines 110, connected to the camera section 100, in the movable unit 180, the lower movable part 102 may have cutouts 102S each having a recess through which a part of the line 110 can be inserted.

In the movable unit 180, the inclination detection magnet 406, the pair of rotation detection magnets 403, the pair of panning driving magnets 401, and the pair of tilting driving magnets 402 are provided. It is preferable that the detection magnets and the driving magnets mounted on the movable unit 180 are inserted through the opening 102H and located inside the lower movable part 102 so as not to be exposed to the convex partial spherical surface 102R. The inclination detection magnet 406 is located on the optical axis 10 on a bottom of the lower movable part 102. Preferably, the lower movable part 102 is formed of a highly slidable resin. More preferably, the lower movable part 102, the inclination detection magnet 406, the pair of panning driving magnets 401, and the pair of tilting driving magnets 402 are integrally molded.

As shown in FIG. 9B and FIG. 10B, the panning magnetic yokes 203 and the tilting magnetic yokes 204 located inside the base 200 are each formed of a magnetic member. Therefore, the panning driving magnets 401 located inside the lower movable part 102 so as to face the panning magnetic yokes 203, and the tilting driving magnets 402 located inside the lower movable part 102 so as to face the tilting magnetic yokes 204, each act as an attracting magnet, and a magnetic attracting force is generated therebetween. Specifically, a magnetic attracting force F1 is generated between each panning magnetic yoke 203 and the corresponding panning driving magnet 401, and another magnetic attracting force F1 is generated between each tilting magnetic yoke 204 and the corresponding tilting driving magnet 402.

Now, with reference to FIG. 18, FIG. 19A, FIG. 19B, FIG. 20A and FIG. 20B, a location and a structure of the support balls 55 will be described.

In an area of the recessed spherical surface 200A as seen in the direction of the optical axis 10 (FIG. 18 and FIG. 19A), the three cylindrical recesses 200F are formed at an interval of an angle θb from the panning direction rotation axis 12. Into each cylindrical recess 200F, the support ball holder 56 is inserted (FIG. 18). In order to support the movable unit uniformly, it is preferable that the angle θb is 120 degrees.

Into the support ball holders 56 in the three cylindrical recesses 200F, the three support balls 55 are respectively inserted. Each support ball 55 is in line contact with an inner surface of the corresponding support ball holder 56. The support balls 55 protrude from the recessed spherical surface 200A. The three support balls 55 each have a convex partial spherical surface, and are in contact with the convex partial spherical surface 102R of the lower movable part 102 at three contact points 102P in total.

As shown in FIG. 20B, straight lines 60 and 61 which each connect a sphere center of the convex partial spherical surface of the support ball 55, namely, the sphere center of the support ball 55, and the sphere center 70 of the convex partial spherical surface 102R of the lower movable part 102 are each inclined downward at a tilt angle θs (tilt angle C) with respect to a horizontal plane P which is perpendicular to the optical axis 10 and passes the sphere center 70 of the convex partial spherical surface 102R. The tilt angle θs is preferably in the range of 30 to 60 degrees, and is more preferably 45 degrees.

Owing to the above-described structure, the lower movable part 102 is supported by the fixed unit at merely three points, and the support balls 55 are rotatable. Therefore, the friction which is caused between the movable unit and the fixed unit can be decreased to a maximum possible degree, and thus the movable unit has an extremely high dynamic characteristic.

As shown in FIG. 10B, the panning magnetic yokes 203 and the tilting magnetic yokes 204 inserted into the base 200 and act as the rolling magnetic yokes are each formed of a magnetic member. Therefore, the magnetic attracting force F1 is generated between each panning magnetic yoke 203 and the panning driving magnet 401 acting as the rolling driving magnet and located inside the lower movable part 102 to face the each panning magnetic yoke 203, and the magnetic attracting force F1 is generated between each tilting magnetic yoke 204 and the tilting driving magnet 402 acting as the rolling driving magnet and located inside the lower movable part 102 to face the each tilting magnetic yoke 204. The magnetic attracting forces F1 act as normal forces to the convex partial spherical surface 102R of the movable unit and the three support balls 55, and also provide a magnetic attracting force F2 as a synthesized vector in the direction of the optical axis 10.

The movable unit can be supported by the fixed unit with the three balls, and the support balls 55 are located at an equal interval of 120 degrees around the optical axis 10. Owing to such a highly stable support structure, an extremely high dynamic characteristic can be realized. Especially when the tilt angle θs is about 45 degrees, as shown in FIG. 9B, forces received by circumferential contact parts between the support balls 55 and the support ball holders 56 are made equal by the magnetic attracting force F2. Therefore, the coefficient of friction between the movable unit and the fixed unit can be further decreased.

Owing to the magnetic attracting force F2, the lower movable part 102 is freely rotated around the sphere center 70 while the three support balls 55 in the base 200 and a partial spherical surface of the convex partial spherical surface 102R of the lower movable part 102 make a point contact at the contact points 102P (FIG. 9B). In other words, the movable unit 180 is supported by the fixed unit in the state where the contact points 102P are located on a circumference centered around the optical axis 10. However, a feature of this embodiment is that the recessed spherical surface 200A of the base 200 and the convex partial spherical surface 102R of the lower movable part 102 are supported by point contact of at least three or more points. The specific structure for realizing such a manner of support is not limited to the use of the support balls. For example, such a manner of support may be realized by a convexed part having three convex partial spherical surfaces formed of a resin or the like.

Needless to say, the three support balls 55 are prevented by a disengagement preventive restriction surface 201A of the fall preventive member 201 from being disengaged even when an impact is applied to the camera driving apparatus 165. The above-described structure for supporting the movable unit 180 allows the movable unit 180 to make rotations in two inclination directions, namely, a rotation in the panning direction 20 of rotating around the panning direction rotation axis 12 which is perpendicular to the optical axis 10 and passes the sphere center 70, and a rotation in the tilting direction 21 of rotating around the tilting direction rotation axis 11 which is perpendicular to the optical axis 10 and the panning direction rotation axis 12. The above-described support structure also allows the movable unit 180 to rotate in the rolling direction 22 around the optical axis 10 of the lens.

Specifically, the lower movable part 102 has such a shape that is obtained as a result of a part of a sphere being removed. Therefore, the sphere center 70 matches a position which is the center of the lower movable part 102 and also is the center of gravity of lower movable part 102. Owing to this, the movable unit 180 can rotate in the panning direction 20, the tilting direction 21 and the rolling direction 22 at substantially equal moments. As a result, in whichever manner the movable unit 180 may rotate in the panning direction 20, the tilting direction 21 or the rolling direction 22, the movable unit 180 can be further rotated in the panning direction 20, the tilting direction 21 or the rolling direction 22 at substantially the same driving force. Thus, the movable unit 180 can be always driven at high precision.

The sphere center 70, namely, the center of rotation of the movable unit 180, matches the center of gravity of the movable unit 180. Therefore, the moment at which the movable unit 180 is rotated in the panning direction 20, the tilting direction 21 and the rolling direction 22 is very small. Hence, merely a small driving force is needed to keep the movable unit 180 in a neutral state or to rotate the movable unit 180 in the panning direction 20, the tilting direction 21 or the rolling direction 22. This can decrease the power consumption of the camera driving apparatus. Especially the driving current needed to keep the movable unit 180 in the neutral state may be made almost zero.

As can be seen, according to this embodiment, the movable unit 180 having the camera section 100 built therein is supported at the sphere center 70, which is the center of gravity, in a concentrated manner. This can decrease the frictional load and also significantly suppress the mechanical resonance in the driving frequency range.

The panning driving magnets 401 and the tilting driving magnets 402 provide a certain normal force between the support balls 55 and the convex partial spherical surface 102R in a dispersed manner by a certain magnetic attracting force without being influenced by the pivoting angle. This can suppress the fluctuation in the frictional load caused in accordance with the pivoting angle and thus can realize good phase and gain characteristics in the driving frequency range.

In the case where the lower movable part 102 having the convex partial spherical surface 102R and the support ball holders 56 are formed of a resin such as a plastic material or the like, the friction between the support balls 55 and the convex partial spherical surface 102R in contact with each other can be further decreased. In this case, the support structure has a high anti-abrasion characteristic.

Preferably, the camera driving apparatus 165 includes the fall preventive member 201 (FIG. 1 and FIG. 4C) for restricting movement of the movable unit 180 so that the movable unit 180 is not disengaged from the fixed unit. The fall preventive member 201 includes the disengagement preventive restriction surface 201A. When the movable unit 180 is moved away from the fixed unit, the lower movable part 102 of the movable unit 180 and the disengagement preventive restriction surface 201A contact each other and thus the movement of the movable unit 180 is restricted (FIG. 4A). As shown in FIG. 11B, a prescribed gap 50 is provided between the convex partial spherical surface 102R of the lower movable part 102 and the disengagement preventive restriction surface 201A of the fall preventive member 201 so that the lower movable part 102 is freely pivotable with respect to the sphere center 70 in the entire movable range of the lower movable part 102.

Preferably, the disengagement preventive restriction surface 201A has a recessed partial spherical surface having a center matching the sphere center 70 of the convex partial spherical surface 102R of the lower movable part 102. The fall preventive member 201 is fixed to the contact surface 200B of the base 200. The gap 50 is formed between the convex partial spherical surface 102R and the disengagement preventive restriction surface 201A in the state where the convex partial spherical surface 102R of the lower movable part 102 is in point contact with the support balls 55 in the fixed unit at the contact points 102P.

The gap 50 is set to have a distance with which even when the convex partial spherical surface 102R of the lower movable part 102 is separated from the support balls 55, the convex partial spherical surface 102R can be returned by the magnetic attracting forces F1 to the point contact state with the support balls 55 at the contact points 102P.

Namely, even in the state where the movable unit 180 is moved upward by a distance equal to the gaps 50 and thus the disengagement preventive restriction surface 201A and the convex partial spherical surface 102R contact each other, the movable unit 180 can return to the original state where the convex partial spherical surface 102R is in point contact with the support balls 55.

Owing to this, the camera driving apparatus according to this embodiment has a high impact resistance by which the movable unit 180, even if being instantaneously disengaged from a prescribed position, can be immediately returned to the original well-supported state by the magnetic attracting forces F1.

Now, a structure for driving the movable unit 180 will be described in detail.

As shown in FIG. 2, the lower movable part 102 has the pair of panning driving magnets 401 located symmetrically with respect to the optical axis 10 in order to drive the movable unit 180 to be rotated in the panning direction 20, and also has the pair of tilting driving magnets 402 located symmetrically with respect to the optical axis 10 in order to drive the movable unit 180 to be rotated in the tilting direction 21. The expression "symmetrically with respect to the optical axis 10" used for the components provided in the fixed unit refers to the optical axis 10 in the state where the movable unit 180 is in the neutral state, namely, is not inclined with respect to the fixed unit.

The panning driving magnets 401 are magnetized to one pole so as to have a magnetic flux in a direction of the tilting direction rotation axis 11. Similarly, the tilting driving magnets 402 are magnetized to one pole so as to have a magnetic flux in a direction of the panning direction rotation axis 12.

As shown in FIG. 1, FIG. 3B and the like and as described above, the pair of panning magnetic yokes 203 are provided on the circumference of the base 200 centered around the optical axis 10 so as to face the pair of panning driving magnets 401 respectively, and the pair of tilting magnetic yokes 204 are provided on the circumference of the base 200 centered around the optical axis 10 so as to face the pair of tilting driving magnets 402 respectively.

As shown in FIG. 5A through FIG. 8, the pair of panning magnetic yokes 203 located on the base 200 in the direction of the tilting direction rotation axis 11 are respectively wound around by the pair of panning driving coils 301. The pair of panning driving coils 301 are respectively wound around by the rolling driving coils 303 in a direction perpendicular to the winding direction of the panning driving coils 301.

Similarly, the pair of tilting magnetic yokes 204 located in the direction of the panning direction rotation axis 12 perpendicular to the tilting direction rotation axis are respectively wound around by the pair of tilting driving coils 302. The pair of tilting driving coils 302 are respectively wound around by the rolling driving coils 303 in a direction perpendicular to the winding direction of the tilting driving coils 302.

In other words, the driving sections for driving the movable unit 180 in the panning direction 20, the tilting direction 21 and the rolling direction 22 are independently provided in a dispersed manner on a circumference centered around the optical axis 10.

According to such a structure, a magnetic gap between each of the panning magnetic yokes 203 and the corresponding panning driving magnet 401, and a magnetic gap between each of the tilting magnetic yokes 204 and the corresponding tilting driving magnet 402 can be provided uniformly. This can improve magnetic flux densities thereof uniformly, and thus significantly improves the driving efficiency in the panning direction 20, the tilting direction 21 and the rolling direction 22.

Now, a structure for locating an inclination driving section and a rotation driving section in a height direction in the direction of the optical axis 10 will be described.

As shown in FIG. 9B, straight lines 30 and 31 are respectively perpendicular to winding center axes 40 and 41 of the tilting driving coils 302 wound around the tilting magnetic yokes 204 which are fixed to the base 200, and pass the sphere center 70 and respectively pass centers of the tilting driving coils 302. The straight lines 30 and 31 are each inclined downward at a tilt angle θp (tilt angle A) of 45 degrees or less with respect to the horizontal plane P which is perpendicular to the optical axis 10 of the movable unit in the neutral state and passes the sphere center 70. The pair of tilting driving magnets 402 are located in an inclined state with respect to the movable unit 180 so as to face the pair of tilting driving coils 302 respectively.

Although not shown, straight lines which are respectively perpendicular to winding center axes of the panning driving coils 301 wound around the panning magnetic yokes 203 which are fixed to the base 200, and pass the sphere center 70 and respectively pass centers of the panning driving coils 301, are each inclined downward at a tilt angle θp (tilt angle A) of 45 degrees or less with respect to the horizontal plane P which are perpendicular to the optical axis 10 of the movable unit in the neutral state and passes the sphere center 70. The pair of panning driving magnets 401 are also located in an inclined state with respect to the movable unit 180 so as to face the pair of panning driving coils 301 respectively. Straight lines which are respectively perpendicular to winding center axes of the rolling driving coils 303, and pass the sphere center 70 and respectively pass centers of the rolling driving coils 303, are each inclined downward at a tilt angle θr (tilt angle B) of 45 degrees or less with respect to the horizontal plane P which is perpendicular to the optical axis 10 and passes the sphere center.

As shown in FIG. 9B, the winding center axes 40 and 41 match center lines of the pair of openings 200T through which the tilting magnetic yokes 204 and the tilting driving coils 302 shown in FIG. 7 and FIG. 8 are inserted into the base 200. Although not shown, center lines of the pair of openings 200P through which the panning magnetic yokes 203 and the panning driving coils 301 are inserted into the base 200 also match the winding center axes of the panning driving coils 301.

As described above, in the case where the tilt angle θp is set to 45 degrees of less, the height of the fixed unit can be decreased to realize space savings and height reduction of the camera driving apparatus. Each of the tilt angle θp and θr is preferably in the range of about to 25 degrees, and is more preferably, for example, 20 degrees.

When the pair of panning driving coils 301 are electrified, the pair of panning driving magnets 401 each receive a couple electromagnetic force, and thus the lower movable part 102, namely, the movable unit 180, is driven to rotate in the panning direction 20 around the panning direction rotation axis 12. Similarly, when the pair of tilting driving coils 302 are electrified, the pair of tilting driving magnets 402 each receive a couple electromagnetic force, and thus the movable unit 180 is driven to rotate in the tilting direction 21 around the tilting direction rotation axis 11.

When the panning driving coils 301 and the tilting driving coils 302 are electrified at the same time, the movable unit 180 having the camera section 100 mounted thereon can be inclined two dimensionally. The movable unit 180 shown in FIG. 12A, FIG. 12B, FIG. 13A and FIG. 13B is obtained by electrifying the panning driving coils 301 and the tilting driving coils 302 at the same time with an equivalent level of current. When the coils 301 and 302 are electrified as described above, the movable unit 180 is inclined in the panning direction 20 and the tilting direction 21 at the same angle, and as a result, is inclined at the synthesized angle θxy in a direction of the straight line 13 which has an angle of 45 degrees with respect to the panning direction 20 and the tilting direction 21.

When the four rolling driving coils 303 are electrified, the movable unit 180 receives an electromagnetic force in the rolling direction and is driven to rotate in the rolling direction 22 around the optical axis 10.

As can be seen, this embodiment adopts a moving magnet driving system in which the panning driving magnets 401 and the tilting driving magnets 402 are provided in the movable unit 180. This structure generally involves a problem that the weight of the movable unit 180 is increased. However, this structure does not require suspension of driving lines to the movable unit 180 and merely requires a power supply line of the camera section 100 and requires an output signal to be transmitted between the movable unit 180 and an external device. In the case where the camera section 100 is a wireless camera, only the power supply line is needed. In addition, the center of gravity of the movable unit 180 matches the pivoting center of the movable unit 180. Therefore, even when the driving magnets mounted on the movable unit 180 increases the weight thereof, the turning moment of the movable unit 180 is not increased much. Therefore, according to this embodiment, the advantages of the moving magnet driving system can be enjoyed while the problem caused by the increase in the weight is suppressed.

Now, the power supply line and output signal transmission means of the camera section 100 will be described.

As shown in FIG. 1, FIG. 2, FIG. 6A, FIG. 6B, FIG. 9, FIG. 11A, FIG. 11B, FIG. 13A and FIG. 13B, the pair of lines 110 acting as the transmission means are located in line symmetry with respect to the optical axis 10. More specifically, the pair of lines 110 are located in line symmetry with respect to the optical axis 10 on a plane including the optical axis 10 and having an angle of 45 degrees with respect to the panning direction 20 and the tilting direction 21.

As shown in FIG. 1 and FIG. 2, a first fixing holder 120 for holding and positioning each line 110 is fixed on a contact surface 200C of the base 200. As shown in FIG. 11B and FIG. 13B, an inclined surface 120A (see FIG. 1) of the first fixing holder 120 is inclined downward from a horizontal plane which is perpendicular to the optical axis 10 and includes the sphere center 70.

A rear surface of each line 110 is held and fixed to the inclined surface 120A by an adhesive, etc. or a second fixing holder 130. The first fixing holder 120 is fixed to the contact surface 200C of the base 200, and thus the line 110 is held by the inclined surface 120A (see FIG. 1 and FIG. 2) and the second fixing holder 130 and is positioned.

Connection of the lines 110 to the movable unit 180 will be described. As shown in FIG. 2, the movable unit 180 includes a camera unit fixing plate 160 for holding and fixing the camera section 100 to the camera cover 150. The pair of lines 110 are fixed to the camera unit fixing plate 160 by line fixing holders 170.

Owing to this, the lines 110 are bent downward. Therefore, as shown in FIG. 13B, even in the state where the movable unit 180 is inclined at the tilt angle θxy, the lines 110 can form a slow curve. Thus, a reaction to the lower movable part 102, which is caused by a bent spring characteristic of the lines 110, can be decreased.

The rotation angle of the movable unit 180 in the rolling direction 22 around the optical axis 10 is restricted by contact of a wall defining the opening 102W of the lower movable part 102 and the connecting rod 801 fixed to the base 200. Since the connecting rod 801 is inserted into the opening 102W, the movable unit 180 is rotated around the optical axis 10 in the range of an opening defined by the opening 102W without the coupling rod 801 contacting the wall defining the opening 102W. When the movable unit 180 is about to rotate beyond the range of the opening, the connecting rod 801 contacts the wall defining the opening 102W to prevent the movable unit 180 from rotating further.

The moving magnet driving system has a significant advantage that the heat of the panning driving coils 301, the tilting driving coils 302 and the rolling driving coils 303 can be cooled by the base 200 via the panning magnetic yokes 203 and the tilting magnetic yokes 204. In addition, for setting the tilt angle in the panning direction 20 and the tilting direction 21 and also setting the rotation angle in the rolling direction 22 to 20 degrees or larger, the moving magnet driving system is advantageous in decreasing the size and the weight of the movable unit 180. By contrast, a moving coil driving system may possibly increase the size of the driving coils excessively and thus increase the weight of the moving unit 180.

As can be seen, according to this embodiment, the center axes of the camera section 100, the lower movable part 102, the convex partial spherical surface 102R of the lower movable part 102, the disengagement preventive restriction surface 201A, the support balls 55 provided on the base 200, the inclination driving section, the rotation driving section, the inclination detection magnet 406, and the rotation detection magnets 403 all pass the sphere center 70, which is the support center and also the driving center.

Therefore, the center of gravity of the movable unit 180 matches the sphere center 70, and thus the movable unit 180 can be supported at the center of gravity thereof and also is rotatable around three axes which pass the center of gravity of the movable unit 180 and are perpendicular to one another. In addition, the movable unit 180 can be prevented from being disengaged.

The camera driving apparatus 165 may include a viscous member (not shown) in order to decrease the amplitude increase coefficient (Q factor) of the movable unit 180. In this case, as shown in FIG. 9B and FIG. 10B, the viscous member is provided between the convex partial spherical surface 102R of the movable unit 180 and the recessed spherical surface 200A of the base 200 or the disengagement preventive restriction surface 201A of the fall preventive member 201. This can decrease the amplitude increase coefficient (Q factor) of vibration caused by a magnetic spring effect, which is provided by a fluctuation in the magnetic attracting force caused in accordance with the inclination and rotation angles between the panning driving magnets 401 and the tilting driving magnets 402 provided in the movable unit 180 and the panning magnetic yokes 203 and the tilting magnetic yokes 204 provided on the base 200, and also can decrease the Q factor of the mechanical normal mode. Thus, a good control characteristic can be provided.

An area of the convex partial spherical surface 102R of the lower movable part 102 where there is no trace of the contact points 102P may have a convexed and concaved pattern (not shown) in the entire range in which the movable unit 180 is movable. The convexed and concaved pattern increases the contact area of the surface with the viscous member and thus can increase the viscous resistance. This significantly improves the viscous attenuation characteristic.

Now, detection of an inclination or a rotation of the movable unit 180 will be described. First, detection of a tilt angle of the movable unit 180 in the panning direction 20 and the tilting direction 21 will be described in detail.

As shown in FIG. 1, FIG. 2, FIG. 7, FIG. 8 and FIG. 14, the camera driving apparatus 165 includes the first magnetic sensor 501 as a first detector in order to detect the tilt angle of the movable unit 180. The first magnetic sensor 501 is capable of detecting inclination around two axes or rotation and is located so as to face the inclination detection magnet 406 magnetized to one pole in the direction of the optical axis 10. The first magnetic sensor 501 is inserted into an opening 200H as being on a circuit board 502 and is fixed to the base 200.

As shown in FIG. 1 and FIG. 13B, the circuit board 502 is fixed to the base 200 by adjusting screws 601 via compression springs 600 at three positions. A relative inclination and a distance between the inclination detection magnet 406 and the first magnetic sensor 501 are changed by rotating the three adjusting screws 601 independently. Owing to this, an inclination output signal of the first magnetic sensor 501 can be optimally adjusted.

Inside the first magnetic sensor 501, a pair of hall elements (not shown) are located symmetrically with respect to the optical axis 10 on the tilting direction rotation axis 11, and another pair of hall elements (not shown) are located symmetrically with respect to the optical axis 10 on the panning direction rotation axis 12. The first magnetic sensor 501 makes differential detection of a change in the magnetic force of the inclination detection magnet 406 which is caused by an inclination motion of the movable unit 180 in the panning direction 20 and the tilting direction 21 as a biaxial component and thus can calculate a panning tilt angle and a tilting tilt angle.

As can be seen, according to this embodiment, the distance between the inclination detection magnet 406 and the sphere center 70 can be shortened, and the moving distance of the inclination detection magnet 406 can be shortened as compared with the tilt angle. Owing to this, the first magnetic sensor 501 can be made small.

In this embodiment, the first detector includes the first magnetic sensor 501 and the inclination detection magnet 406. Alternatively, the first detector may have another structure. For example, the first detector may include a light sensor provided in the fixed unit on the optical axis 10 and a light detection pattern provided in the movable unit 180. When the movable unit is inclined, the light detection pattern is inclined. As a result, an amount of light incident on the light sensor is changed. The light sensor detects such a change in the amount of light and thus can calculate an angle of two-dimensional inclination in the panning and tilting directions.

FIG. 16A and FIG. 16B are each an isometric view showing positions of the second magnetic sensors 503 as a second detector for detecting a rotation angle of the movable unit 180 in the rolling direction 22 around the optical axis 10.

The second detector basically includes the pair of second magnetic sensors 503 fixed to the base 200 and the pair of rotation detection magnets 403 fixed to the movable unit 180.

The magnetic circuit for rotation detection provided in the lower movable part 102 of the movable unit 180 includes the pair of rotation detection magnets 403 having different magnetic poles in the direction of the straight line 13, the pair of spherical-surface yokes 510 each having the spherical surface 510A and formed of a magnetic member, the back yoke 520 formed of a magnetic member, and a detection base 530 formed of a resin. The magnetic circuit forms a magnetic gap G (FIG. 16A). In this embodiment, as shown in FIG. 16B, the pair of rotation detection magnets 403 are located symmetrically with respect to the optical axis 10.

In the case where rotation detection magnets 403 have a shape of the spherical-surface yokes 510, the spherical-surface yokes 510 are not necessary. Namely, in the case where the spherical surfaces 510A centered around the sphere center of the partial spherical surface 102R are respectively magnetized to an N pole and an S pole while having the magnetic gap G therebetween, the spherical-surface yokes 510 are not necessary, and the pair of rotation detection magnets 403 do not need to be located symmetrically with respect to the optical axis 10 either.

The magnetic poles of the pair of spherical-surface yokes 510 drastically change at the magnetic gap G. Therefore, when the movable unit 180 is rotated in the rolling direction 22, the drastic change in the magnetic poles caused by the rotation of the magnetic gap G in the rolling direction 22 is detected by the second magnetic sensors 503, and thus the rotation angle in the rolling direction 22 can be detected at high precision.

The magnetic circuit for detecting the rotation in the rolling direction 22 is fixed to a lower part of the camera unit fixing plate 160 so as to be located in the vicinity of the sphere center 70.

As shown in FIG. 14, FIG. 15 and FIG. 16A, the pair of second magnetic sensors 503 are provided so as to face, at a prescribed distance away from, the pair of spherical-surface yokes 510 which form a magnetic path by the rotation detection magnets 403, and are fixed to the base 200 via a magnetic sensor holder 800, the coupling rod 801 and a rotation detection base 803. More specifically, the pair of second magnetic sensors 503 are fixed to one end of the coupling rod 801, and the one end of the coupling rod 801 is inserted into the opening 102W and is located in the vicinity of the sphere center 70. The second detector is located on a plane including the optical axis 10 and the straight line 13. As shown in FIG. 16B, the coupling rod 801 is inclined downward at an angle of $\theta_G$ around the sphere center 70 with respect to the horizontal plane P including the straight line 13.

Owing to the structure in which the coupling rod 801 is inclined downward at an angle of $\theta_G$ with respect to the straight line 13, the second detector can be provided with no interference with the camera section 100, the panning driving magnets 401 or the tilting driving magnets 402 described above.

Since the second detector is provided in the vicinity of the sphere center 70, a moving offset amount of the spherical-surface yokes 510 caused by the inclination of the movable unit 180 in the panning and tilting directions can be significantly decreased. This can decrease the level of a crosstalk signal in the rolling direction 22 which is caused by the inclination of the movable unit 180 in the panning direction 20 and the tilting direction 21.

Owing to such a structure, even when the movable unit 180 is largely inclined in the panning direction 20 and the tilting direction 21, only a rotation angle detection signal in the rolling direction 22 can be extracted.

Now, with reference to FIG. 21A and FIG. 21B, an image capturing posture of the camera driving apparatus 165 will be described. FIG. 21A shows an image capturing posture of the camera driving apparatus 165 in operation. Namely, the tilting direction rotation axis 11 is parallel to a horizontal reference HS for a subject, and the panning direction rotation axis 12 is vertical to the horizontal reference HS. At this posture, good camera driving can be provided.

FIG. 21B shows an image capturing posture of the camera driving apparatus 165 by which the tilting direction rotation axis 11 and the panning direction rotation axis 12 are both inclined at 45 degrees with respect to the horizontal reference HS for the subject.

This image capturing posture has an advantage that when the camera driving apparatus 165 is driven to pan in a direction of the horizontal reference HS for the subject, the panning driving coils 301 and the tilting driving coils 302 can be both electrified to drive the camera driving apparatus 165 in the original panning direction. When the camera driving apparatus 165 is driven to tilt in a direction perpendicular to the horizontal reference HS for the subject, the panning driving coils 301 and the tilting driving coils 302 can be both electrified to drive the camera driving apparatus 165 in the original tilting direction.

Namely, the camera driving apparatus 165 can be driven in the panning direction and the tilting direction, in which the camera driving apparatus 165 is assumed to be driven frequently, by electrifying two types of coils.

As a result of such a manner of driving, when the panning driving coils 301 or the tilting driving coils 302 in the state of being inclined at 45 degrees are driven for driving the camera driving apparatus 165 in the original panning direction or tilting direction, the rotation angle of the movable unit 180 in the direction of the panning direction axis 12 or the direction of the tilting direction axis 11 shown in FIG. 21B is $1/\sqrt{2}$ times larger.

Therefore, in the case where the camera driving apparatus 165 is at the image capturing posture as shown in FIG. 21B, the rotation angle in the original panning direction and also in the original tilting direction, in which the camera driving apparatus 165 is assumed to be driven frequently, is $1/\sqrt{2}$ times larger. Thus, the magnetic spring effect caused by the magnetic attracting force generated between the driving magnets provided in the movable unit and the magnetic yokes provided in the fixed unit can be decreased, which realizes good camera driving.

As can be seen, in the camera driving apparatus according to this embodiment, the sphere center of the convex partial spherical surface of the movable part of the movable unit, and the center axes of the support balls located on the circumference of the fixed unit, are located on the optical axis of the lens of the camera section. Owing to this, a structure of supporting the movable unit at the center of gravity thereof is realized. Thus, the mechanical resonance can be significantly decreased in the driving frequency range.

In the three-point support structure including the support balls in the fixed unit and the convex partial spherical surface of the movable unit, a certain normal force can be provided by a magnetic attracting force, which is not easily influenced by the pivoting angle of the movable unit. Therefore, the change in the frictional load in accordance with the pivoting angle is decreased. Thus, good phase and gain characteristics can be realized in the driving frequency range.

In order to prevent the disengagement of the movable unit 180 by, for example, an external disturbance such as vibration, impact or the like, which is a serious problem peculiar to the conventional structure of supporting by a magnetic attracting force, the fall preventive member provided in the fixed unit has a disengagement preventive restriction surface at a position away from the movable unit by a prescribed gap which allows the movable unit to pivot. Owing to this, the movable unit can be prevented from being disengaged with certainty while the apparatus is prevented from being enlarged.

The position of the disengagement preventive restriction surface of the fixed unit is determined such that even when the movable unit is disengaged until the convex partial spherical surface of the movable unit contacts the disengagement preventive restriction surface, the convex partial spherical surface of the movable unit 180 makes a point contact again with the support balls in the fixed unit by a magnetic attracting force. Owing to this, the camera driving apparatus has a high impact resistance by which the movable unit, even if instantaneously be disengaged, can be immediately returned to the original well-supported state.

The sections for driving the movable unit in the panning, tilting and rolling directions are provided on two lines perpendicular to each other on a plane perpendicular to the optical axis, and include two pairs of driving magnets fixed to the movable unit and two pairs of driving coils provided in the fixed unit on a circumference centered around the optical axis so as to face the two pairs of driving magnets respectively.

The position in the height direction of the optical axis at which these components are inclined downward from the horizontal plane including the sphere center. Therefore, the center of gravity of the movable unit can be driven at the center of the sphere center and also the height of the movable unit can be suppressed low.

The movable unit and the base may be formed of a resin material, or the convex partial spherical surface and surfaces of the support ball holders may be covered with a resin member. In such a case, the support structure does not cause much friction and is highly anti-abrasion.

The gap between the convex partial spherical surface of the movable unit and the inner recessed spherical surface or the disengagement preventive restriction surface of the base may be filled with a viscous member. In such a case, the amplitude increase coefficient (Q factor) of vibration caused by a magnetic spring effect, which is provided by a fluctuation in the magnetic attracting force generated between the driving magnets provided in the movable unit and the magnetic yokes provided in the fixed unit, and the Q factor of the mechanical normal mode, can be decreased. Thus, a good control characteristic can be provided.

On the plane perpendicular to the optical axis, the pair of rotation detection magnets oppositely magnetized to each other and located at an angle of 45 degrees with respect to the panning direction rotation axis and the tilting direction rotation axis are provided in the vicinity of the sphere center of the movable unit. Thus, a change in the magnetic force is detected by the second magnetic sensors provided in the fixed unit.

Since the second detector is provided in the vicinity of the sphere center, the moving offset amount of the second detector caused by the inclination of the movable unit in the panning and tilting directions can be significantly decreased. This can decrease the level of a crosstalk signal in the rolling direction which is caused by the inclination of the movable unit in the panning and tilting directions.

Owing to such a structure, even when the movable unit is largely inclined in the panning direction and the tilting direction, only a rotation angle detection signal in the rolling direction can be extracted. In the fixed unit, the pair of second magnetic sensors are located on the straight line having an angle of 45 degrees with respect to the tilting direction rotation axis or the panning direction rotation axis. Owing to this, the driving sections and the second magnetic sensors are both on the circumference centered around the optical axis, which decreases the size of the camera driving apparatus.

Accordingly, in the camera driving apparatus in this embodiment, for example, the movable unit can be inclined in the panning direction and the tilting direction at a large angle of ±10 degrees or greater, and can be rotated in the rolling direction at a large angle of ±10 degrees or greater. In addition, good vibration compensation control is realized in a wide frequency range of up to about 50 Hz. As a result, the camera driving apparatus realizes high-speed panning, tilting and rolling motions of the camera section, and also compensates for blurring of a captured image caused by camera-shake which occurs when the photographer is walking. The camera driving apparatus has a compact and solid disengagement preventive structure and thus is highly resistance against an external impact such as, for example, vibration or an impact applied to the camera driving apparatus when the apparatus falls.

The rolling driving coils are wound in a cross-winding manner; namely, the panning driving coils and the tilting driving coils are respectively wound around the pair of panning magnetic yokes and the pair of tilting magnetic yokes, and the rolling driving coils are respectively wound around the panning driving coils and the tilting driving coils in a direction perpendicular to the winding direction thereof. This realizes space savings of the fixed unit, and also decreases the size and the number of components of the fixed unit.

As can be seen, the camera driving apparatus according to this embodiment realizes high-speed panning, tilting and rolling motions of the camera section, and also compensates for blurring of an image caused by camera-shake which occurs when the photographer is walking. The camera driving apparatus has a compact and solid disengagement preventive structure and thus is highly resistance against an external impact such as, for example, vibration or an impact applied to the camera driving apparatus when the apparatus falls.

Embodiment 2

Figure 22:
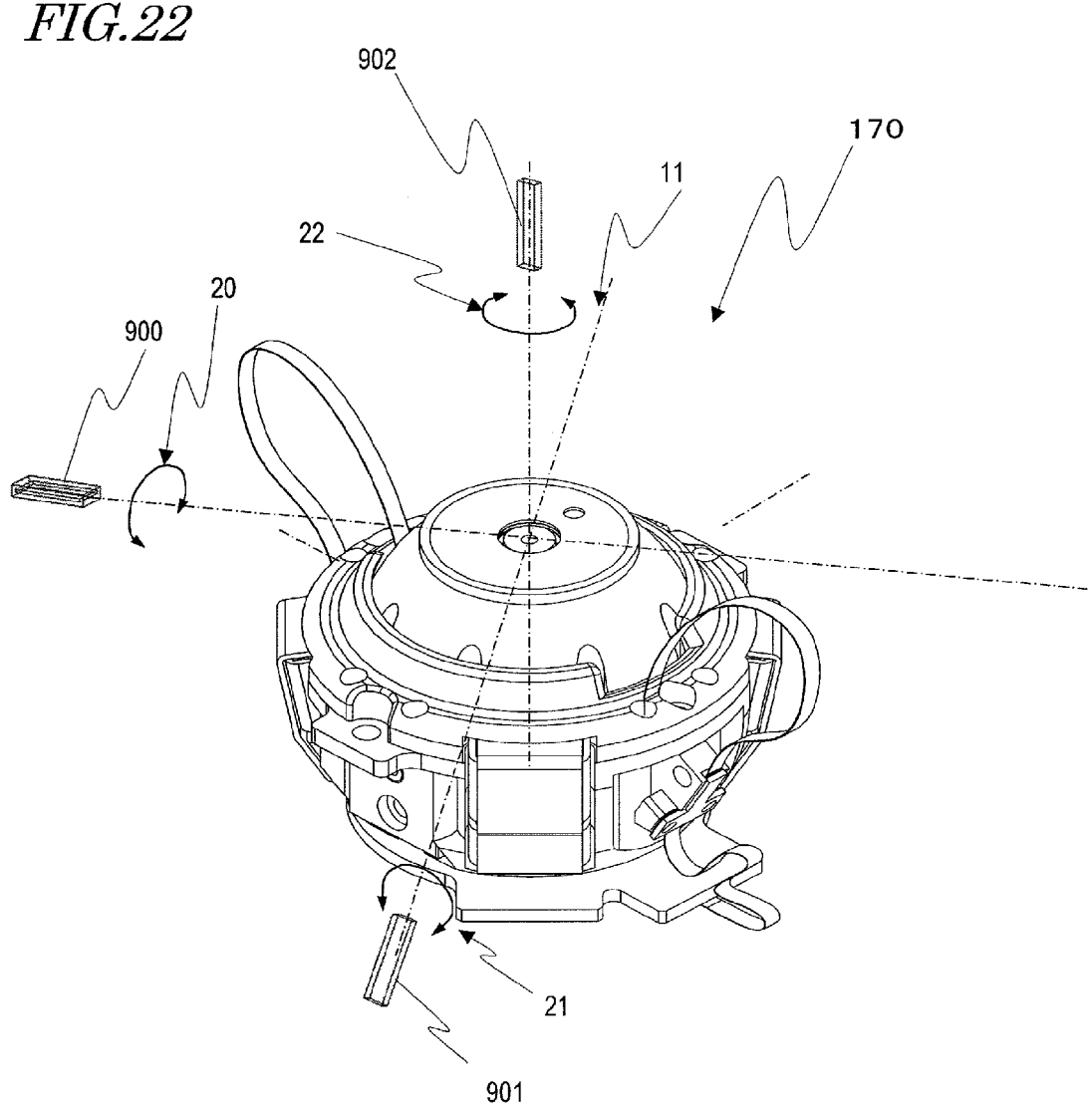
FIG. 22 is an isometric view showing the position of angular velocity sensors in a camera unit in Embodiment 2 according to the present invention.

A camera unit in an embodiment according to the present invention will be described. A camera unit 170 in Embodiment 2 according to the present invention includes a camera driving apparatus and a control section, and can compensate for blurring of an image captured while the photographer is walking. FIG. 22 is an isometric view showing a main part of the camera unit 170, and FIG. 23 is a block diagram of the camera unit 170.

Figure 23:
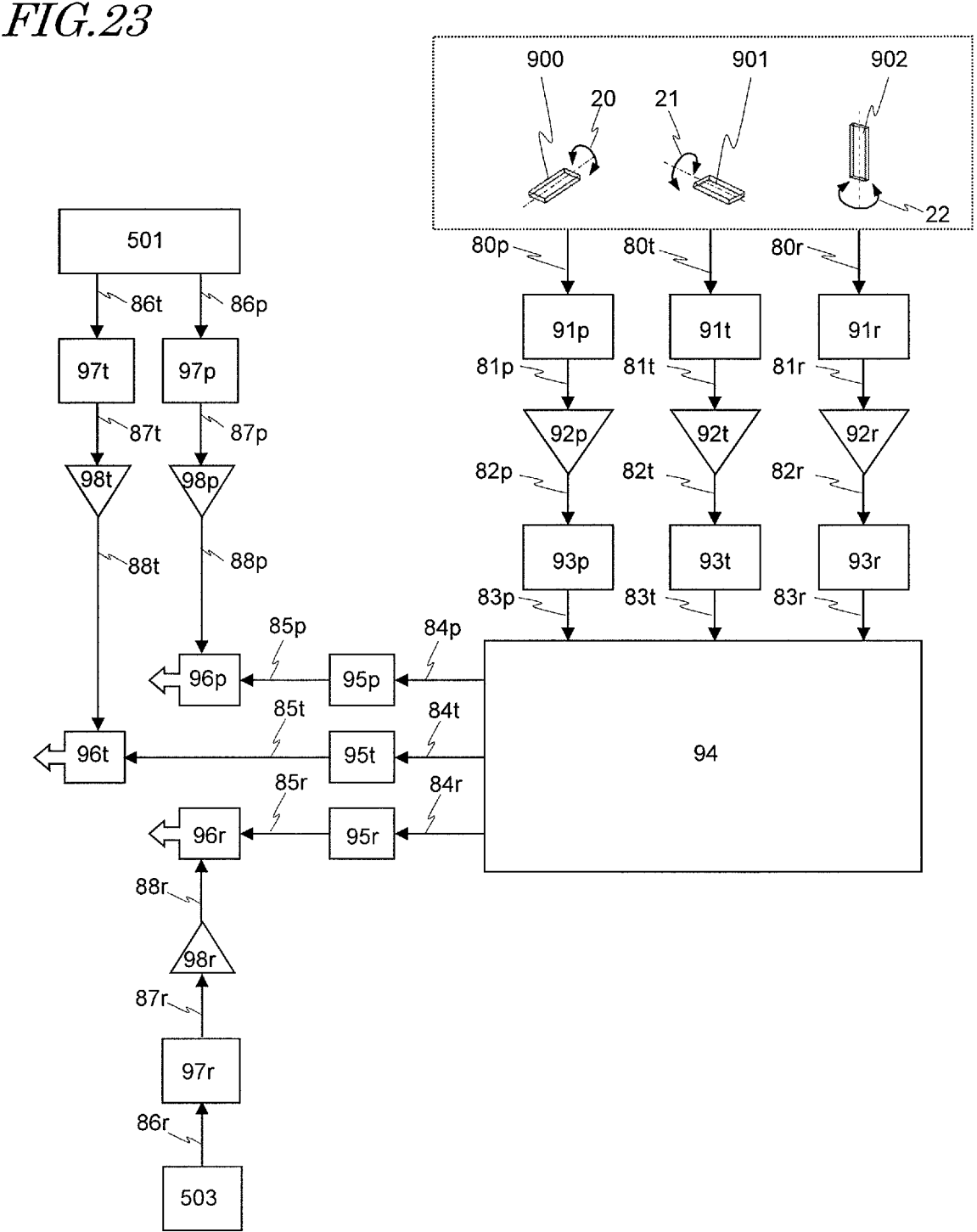
FIG. 23 is a block diagram showing the camera unit in an embodiment.

As shown in FIG. 22 and FIG. 23, the camera unit 170 includes the camera driving apparatus 165, angular velocity sensors 900, 901 and 902, a calculation processing section 94, and driving circuits 96p, 96t and 96r.

The angular velocity sensors 900, 901 and 902 are attached to the base 200 of the camera driving apparatus or a camera unit main body (not shown) to which the base 200 is fixed. The angular velocity sensors 900, 901 and 902 detect angular velocities around the axes represented with the chain lines in the figure. Specifically, the angular velocity sensors 900, 901 and 902 respectively detect the angular velocities in the panning direction 20, the tilting direction and the rolling direction 22. FIG. 22 shows three independent angular velocity sensors 900, 901 and 902. Alternatively, one angular velocity sensor capable of detecting angular velocities around the three axes may be used. The angular velocity sensors only need to detect angular velocities around three axes perpendicular to one another, and the three axes do not need to match the panning direction 20, the tilting direction 21 and the rolling direction 22. In the case where the angular velocities detected by the angular velocity sensors are not the angular velocities in the panning direction 20, the tilting direction 21 and the rolling direction 22, the calculation processing section 94 can convert the obtained values into the angular velocities in the panning direction 20, the tilting direction 21 and the rolling direction 22.

For example, shake angles in the panning direction 20 and the tilting direction 21 caused by the camera-shake when an image is captured are detected by the angular velocity sensors 900 and 901 respectively. A shake angle in the rolling direction 22 caused by a transfer of the walking balance when the photographer takes an image while walking is detected by the angular velocity sensor 902. As shown in FIG. 23, information on the shake angles detected by the angular velocity sensors 900, 901 and 902 is output as angular velocity signals 80p, 80t and 80r respectively.

The angular velocity signals 80p, 80t and 80r are respectively converted into signals suitable for calculation processing to be performed by the calculation processing section 94. Specifically, the angular velocity signals 80p, 80t and 80r are input to analog circuits 91p, 91t and 91r to be deprived of a noise component and a DC drift component. Angular velocity signals 81p, 81t and 81r deprived of the noise component and the DC drift component are input to amplification circuits 92p, 92t and 92r, which respectively output angular velocity signals 82p, 82t and 82r having appropriate values. Then, these signals are converted into digital signals by A/D converters 93p, 93t and 93r, and the obtained digital signals 83p, 83t and 83r are input to the calculation processing section 94.

The calculation processing section 94 performs integration processing of converting the angular velocities into camera-shake angles, and thus sequentially calculates shake angles in the panning direction 20, the tilting direction 21 and the rolling direction 22. The calculation processing section 94 also performs three-axis shake compensation processing. The three-axis shake compensation processing performed by the calculation processing section 94 is an open loop control of driving the movable unit having the camera section 100 mounted thereon so as to suppress the angular velocities in accordance with the angular velocity signals 83p, 83t and 83r detected by the respective angular velocity sensors 900, 901 and 902. The calculation processing section sequentially outputs target rotation angle signals 84p, 84t and 84r as optimum digital shake compensation amounts in consideration of the frequency response characteristic, the phase compensation, the gain compensation and the like of the camera driving apparatus 165.

The target rotation angle signals 84p, 84t and 84r are converted into analog signals by the D/A converters 95p, 95t and 95r, and input to the driving circuits 96p, 96t and 96r as analog target rotation angle signals 85p, 85t and 85r.

Meanwhile, in the camera driving apparatus 165, the first and second magnetic sensors 501 and 503, for detecting the rotation angle of the movable unit having the camera section 100 mounted thereon with respect to the base 200, output rotation angle signals 86p, 86t and 86r in the panning direction 20, the tilting direction 21 and the rolling direction 22. The rotation angle signals 86p, 86t and 86r are deprived of a noise component and a DC drift component by analog circuits 97p, 97t and 97r and output as rotation angle signals 87p, 87t and 87r. From these signals, rotation angle signals 88p, 88t and 88r having appropriate output values are obtained by amplification circuits 98p, 98t and 98r. The rotation angle signals 88p, 88t and 88r are input to the driving circuits 96p, 96t and 96r.

The driving circuits 96p, 96t and 96r are formed of a feedback system of feeding back the rotation angle signals 88p, 88t and 88r to the target rotation angle signals 85p, 85t and 85r. Therefore, when no external force is applied to the camera unit 170, the driving circuits 96p, 96t and 96r control the angles of the movable unit having the camera section 100 mounted thereon in the panning direction 20, the tilting direction 21 and the rolling direction 22 such that the movable unit is at a prescribed angular position. Based on the target rotation angle signals 85p, 85t and 85r and the rotation angle signals 88p, 88t and 88r, driving signals for driving the panning driving coils 301, the tilting driving coils 302 and the rolling driving coils 303 are output from the driving circuits 96p, 96t and 96r. Owing to this, the camera driving apparatus 165 executes a feedback control on the angular position, and the movable section 102 having the camera section 100 mounted thereon is driven such that the rotation angle signals 88p, 88t and 88r are equal to the target rotation angle signals 85p, 85t and 85r.

By this series of driving control, the shake compensation for the camera section 100 is made, and thus photographing can be made stably even while the photographer is walking.

In Embodiment 2 according to the present invention, a control system mainly using the rotation angle signals obtained by integrating the outputs from the angular velocity sensors is shown. Alternatively, it is also possible to detect rotation angle signals of the camera section 100 by inputting the rotation angle signals 88p, 88t and 88r from the first and second magnetic sensors 501 and 503 of the camera driving apparatus to the calculation processing section 94 via the A/D converter and performing differential processing. In such a case, the calculation processing section 94 can further construct an angular velocity feedback system using the angular velocity signals 83p, 83t and 83r from the camera apparatus and the rotation angle signals from the camera section 100. Thus, the camera-shake and walk-shake can be suppressed at higher precision.

A camera driving apparatus and a camera unit in embodiments according to the present invention allow the camera section to rotate at a larger angle than a conventional camera-shake compensation device. Therefore, the camera driving apparatus and the camera unit according to the present invention are capable of chasing a subject specified in an image such that the subject is located at the center of the image, using image processing or the like.

In addition, the camera driving apparatus can perform photographing while rotating the camera section in the panning direction or the tilting direction, and sequentially synthesize still images or moving images which have been taken. In this manner, super-wide-angle photographing of still images or moving images can be realized.

The camera driving apparatus and the camera unit in Embodiments 1 and 2 include a camera section. In an embodiment according to the present invention, a driving apparatus having a light emitting device or a light receiving device other than a camera mounted thereon and capable of driving such a device freely in three axial directions may be realized. For example, a driving apparatus including a movable unit having a laser device or a light detection element mounted thereon, instead of the camera section, and capable of driving the movable unit freely in three axial directions may be realized. In such a case, if the rotation in the rolling direction is not necessary, the rolling driving section does not need to be provided.

In Embodiments 1 and 2, the panning and tilting driving magnets are used as the attracting magnets, and the panning and tilting magnetic yokes are used as the magnetic members. The camera driving apparatus may include magnets and magnetic members other than these driving magnets and magnetic yokes as the attracting magnets and magnetic members.

INDUSTRIAL APPLICABILITY

A camera driving apparatus disclosed by this application includes a structure capable of performing driving in a panning direction, a tilting direction and a rolling direction, and therefore can compensate for three-axis shakes including rolling shake which is caused by a transfer of the walking balance when the photographer takes an image while walking. Thus, the camera driving apparatus disclosed by this application is preferably usable for various types of imaging devices which need to perform shake compensation of images, for example, wearable cameras. The camera driving apparatus disclosed by this application is also suitable to cameras chasing a subject at a high speed, surveillance cameras, onboard cameras and the like which need to make high-speed panning, tilting and rolling motions.

In addition, a video camera can be provided which realizes high-speed synthesis of captured images by performing high-speed panning and tilting motions, and thus realizes super-wide-angle photographing of still images and also moving images.

REFERENCE SIGNS LIST

10 Optical axis
11, 12 Rotation axis
13, 14 Straight line
20 Panning direction
21 Tilting direction
22 Rolling direction
30-45 Straight line
50 Gap
55 Support ball
70 Sphere center
100 Camera section
102 Movable section
102W Opening
102R Convex partial spherical surface
165 Camera driving apparatus
170 Camera unit
200 Base
200A Recessed spherical surface
200P, 200T Opening
201 Fall preventive member
201A Disengagement preventive restriction surface
203, 204 Magnetic yoke
301, 302, 303 Driving coil
401, 402 Driving magnet
403 Rotation detection magnet
406 Inclination detection magnet
501, 503 Magnetic sensor
510 Spherical-surface yoke
520 Back yoke
600 Compression spring
800 Magnetic sensor holder
801 Coupling rod
803 Rotation detection base

The invention claimed is:
1. A camera driving apparatus, comprising:
a camera section including an imaging element having an imaging plane, a lens having an optical axis and provided for forming an image of a subject on the imaging plane, and a lens barrel for holding the lens;
a movable unit having at least one attracting magnet positioned adjacent a lower surface of the moveable unit, the moveable unit encompassing the camera section built therein, and the movable unit having a first convex partial spherical surface along an outer surface thereof;
a fixed unit having at least one magnetic member and having a recess loosely fitted with at least a part of the movable unit, wherein a magnetic attracting force between the at least one attracting magnet and the at least one magnetic member puts the first convex partial spherical surface of the movable unit and the recess into point or line contact with each other, and thus the movable unit is freely rotatable around a sphere center of the first convex partial spherical surface as the center of rotation;
a panning driving section for inclining the camera section in a panning direction with respect to the fixed unit;
a tilting driving section for inclining the camera section in a tilting direction, perpendicular to the panning direction, with respect to the fixed unit;
a rolling driving section for rotating the camera section in a rolling direction around the optical axis of the lens, with respect to the fixed unit;
a first detector for detecting a tilt angle of the camera section in the panning and tilting directions with respect to the fixed unit; and
a second detector for detecting a rotation angle of the camera section in the rolling direction;
wherein the second detector is provided adjacent to the sphere center of the first convex partial spherical surface.
2. The camera driving apparatus of claim 1, wherein:
the second detector is provided in the vicinity of the sphere center of the movable unit;
the second detector includes:
a pair of rotation detection magnets located symmetrically with respect to the optical axis,
a rod-shaped holder bar fixed to the fixed unit and having one end thereof inserted to a position in the vicinity of the sphere center, and
a pair of second magnetic sensors fixed to the one end of the holder bar so as to face the pair of rotation detection magnets respectively; and the pair of second magnetic sensors detect a change in a magnetic force caused by a rotation of the rotation detection magnets to calculate the rotation angle of the camera section.

3. The camera driving apparatus of claim 2, wherein the movable unit has an opening into which the holder bar is inserted, and the opening and the holder bar contact each other to restrict the rotation angle of the movable unit.

4. The camera driving apparatus of claim 1, wherein the fixed unit has at least three second convex partial spherical surfaces located in the recess, and the second convex partial spherical surfaces and the first convex partial spherical surface of the movable unit are in point contact with each other.

5. The camera driving apparatus of claim 1, wherein the fixed unit has a recessed conical surface which forms an inner surface of the recess, and the conical surface and the first convex partial spherical surface of the movable unit are in line contact with each other.

6. The camera driving apparatus of claim 1, further comprising a fall preventive member provided in the fixed unit and having a restriction surface for restricting a movement of the movable unit to prevent the movable unit from being disengaged from the fixed unit;
wherein the restriction surface has a recessed partial spherical surface having a center matching the sphere center of the first convex partial spherical surface.

7. The camera driving apparatus of claim 1, wherein:
the panning driving section includes:
a pair of panning driving magnets located in the movable unit symmetrically with respect to the optical axis,
a pair of panning magnetic yokes located in the fixed unit so as to face the pair of panning driving magnets respectively, and
a pair of panning driving coils wound around the pair of panning magnetic yokes respectively;
the tilting driving section includes:
a pair of tilting driving magnets located in the movable unit symmetrically with respect to the optical axis,
a pair of tilting magnetic yokes located in the fixed unit so as to face the pair of tilting driving magnets respectively, and
a pair of tilting driving coils wound around the pair of tilting magnetic yokes respectively;
the pair of panning driving magnets and the pair of panning driving coils are located on a straight line passing the sphere center of the first convex partial spherical surface;
the pair of tilting driving magnets and the pair of tilting driving coils are located on another straight line passing the sphere center of the first convex partial spherical surface and crossing the straight line perpendicularly; and
a middle point between the pair of panning driving magnets on the optical axis, a middle point between the pair of panning driving coils on the optical axis, a middle point between the pair of tilting driving magnets on the optical axis, and a middle point between the pair of tilting driving coils on the optical axis substantially match the sphere center of the first convex partial spherical surface.

8. The camera driving apparatus of claim 7, wherein:
the rolling driving section includes four rolling driving coils wound around the pair of panning magnetic yokes and the pair of tilting magnetic yokes; and
the pair of panning driving magnets and the pair of tilting driving magnets are used as rolling driving magnets.

9. The camera driving apparatus of claim 8, wherein the at least one magnetic member includes the pair of panning magnetic yokes and the pair of tilting magnetic yokes.

10. The camera driving apparatus of claim 8, wherein the at least one attracting magnet includes the pair of panning driving magnets and the pair of tilting driving magnets.

11. The camera driving apparatus of claim 7, wherein:
straight lines which are respectively perpendicular to winding center axes of the pair of panning driving coils and the pair of tilting driving coils, pass the sphere center of the first convex partial spherical surface and respectively pass the driving coils have a tilt angle A of 45 degrees or less with respect to a horizontal plane which is perpendicular to the optical axis and passes the sphere center of the first convex partial spherical surface; and
the pair of panning driving magnets and the pair of tilting driving magnets are located as inclining with respect to the movable unit so as to face the pair of panning driving coils and the pair of tilting driving coils respectively.

12. The camera driving apparatus of claim 8, wherein:
straight lines which are respectively perpendicular to winding center axes of the rolling driving coils and pass the sphere center of the first convex partial spherical surface have a tilt angle B of 45 degrees or less with respect to a horizontal plane which is perpendicular to the optical axis and passes the sphere center of the first convex partial spherical surface and centers of the rolling driving coils; and
the rolling driving magnets are located as inclining with respect to the movable unit so as to face the rolling driving coils respectively.

13. The camera driving apparatus of claim 11, wherein the tilt angle A is 20 degrees.

14. The camera driving apparatus of claim 12, wherein the tilt angle B is 20 degrees.

15. The camera driving apparatus of claim 5, wherein a straight line connecting a sphere center of each of the second convex partial spherical surfaces and the sphere center of the first convex partial spherical surface has a tilt angle C of 45 degrees with respect to a horizontal plane which is perpendicular to the optical axis and passes the sphere center of the first convex partial spherical surface.

16. The camera driving apparatus of claim 8, wherein
the pair of panning driving magnets and the pair of tilting driving magnets are located inside the movable unit and are not exposed to the first convex partial spherical surface.

17. The camera driving apparatus of claim 8, wherein the pair of panning driving coils, the pair of tilting driving coils, and the rolling driving coils are located inside the fixed unit and are not exposed from the recess.

18. The camera driving apparatus of claim 16, wherein the movable unit is formed of a resin material.

19. The camera driving apparatus of claim 16, wherein the movable unit is integrally molded with the pair of panning driving magnets and the pair of tilting driving magnets.

20. The camera driving apparatus of claim 17, wherein the fixed unit is formed of a resin material.

21. The camera driving apparatus of claim 20, wherein the fixed unit is integrally molded with the pair of panning driving coils, the pair of tilting driving coils, the rolling driving coils, the pair of panning magnetic yokes, and the pair of tilting magnetic yokes.

22. The camera driving apparatus of claim 1, wherein the movable unit has a center of gravity matching the sphere center of the first convex partial spherical surface.

23. The camera driving apparatus of claim 7, further comprising lines connected to the camera section and formed of flexible cables;

wherein the lines are located in line symmetry with respect to the optical axis, and are each fixed to the movable unit in a direction having an angle of 45 degrees with respect to a line connecting the pair of tilting driving magnets to each other or a line connecting the pair of panning driving magnets to each other on a plane perpendicular to the optical axis.

24. The camera driving apparatus of claim 1, wherein: the first detector includes:
    a first magnetic sensor fixed to the fixed unit; and
    an inclination detection magnet provided in the movable unit; and
    the first magnetic sensor detects a change in a magnetic force caused by inclination of the inclination detection magnet to calculate a two-dimensional tilt angle of the camera section in the panning direction and the tilting direction.

25. The camera driving apparatus of claim 24, wherein the first magnetic sensor and the inclination detection magnet are located on the optical axis.

26. The camera driving apparatus of claim 1, wherein: the first detector includes:
    a light sensor fixed to the fixed unit; and
    a light detection pattern provided on a part of the first convex partial spherical surface of the movable unit; and
    the light sensor detects a change in an amount of light incident thereon caused by inclination of the light detection pattern to calculate a two-dimensional tilt angle of the camera section in the panning direction and the tilting direction.

27. The camera driving apparatus of claim 26, wherein the light sensor and the light detection pattern are located on the optical axis.

28. The camera driving apparatus of claim 2, wherein when the movable unit is located at a neutral position, the pair of second magnetic sensors, the pair of rotation detection magnets and the holder bar are located on a plane perpendicular to the optical axis, on a straight line having a degree of 45 degrees with respect to a straight line connecting the pair of panning driving magnets and with respect to a straight line connecting the pair of tilting driving magnets.

29. The camera driving apparatus of claim 2, wherein the pair of rotation detection magnets are formed of magnets which are located, on a plane perpendicular to the optical axis, parallel to a straight passing the sphere center of the first convex partial spherical surface and are magnetized oppositely to each other.

30. The camera driving apparatus of claim 6, wherein:
    the restriction surface of the fall preventive member and the first convex partial spherical surface of the movable unit have a gap therebetween; and
    the gap is determined such that the first convex partial spherical surface of the movable unit, even when being separated from the recess of the fixed unit, is returned to a point contact state or a line contact state by the magnetic attracting force.

31. A camera unit, comprising:
    the camera driving apparatus defined by claim 1;
    angular velocity sensor for detecting angular velocities around three axes of the fixed unit which are perpendicular to one another;
    a calculation processing section for generating a target rotation angle signal based on outputs from the angular velocity sensor; and
    a driving circuit for generating a signal for driving the panning driving section and the tilting driving section based on the target rotation angle signal.

32. A camera unit, comprising:
    the camera driving apparatus defined by claim 1 which is rotated by 45 degrees around the optical axis of the camera section;
    angular velocity sensor for detecting angular velocities around three axes of the fixed unit which are perpendicular to one another;
    a calculation processing section for generating a target rotation angle signal based on outputs from the angular velocity sensors; and
    a driving circuit for generating a signal for driving the panning driving section and the tilting driving section based on the target rotation angle signal.

33. An optical device driving apparatus, comprising:
    an optical device, having an optical axis, for receiving or emitting light;
    a movable unit having at least one attracting magnet positioned adjacent a lower surface of the moveable unit, the moveable unit encompassing the optical device built therein, and the movable unit having a first convex partial spherical surface along an outer surface thereof;
    a fixed unit having at least one magnetic member therein and having a recess loosely fitted with at least a part of the movable unit, wherein a magnetic attracting force between the at least one attracting magnet and the at least one magnetic member puts the first convex partial spherical surface of the movable unit and the recess into point or line contact with each other, and thus the movable unit is freely pivotable around a sphere center of the first convex partial spherical surface as the center of rotation;
    a panning driving section for inclining the optical device in a panning direction with respect to the fixed unit;
    a tilting driving section for inclining the optical device in a tilting direction, perpendicular to the panning direction, with respect to the fixed unit;
    a rolling driving section for rotating the optical device in a rolling direction centered around the optical axis of the lens, with respect to the fixed unit;
    a first detector for detecting a tilt angle of the optical device in the panning and tilting directions with respect to the fixed unit; and
    a second detector for detecting a rotation angle of the optical device in the rolling direction;
    wherein the second detector is adjacent to the sphere center of the first convex partial spherical surface.

* * * * *